United States Patent [19]
Katayama et al.

[11] Patent Number: 5,909,505
[45] Date of Patent: *Jun. 1, 1999

[54] COLOR IMAGE ENCODING METHOD AND APPARATUS

[75] Inventors: Akihiro Katayama, Kawasaki; Yasuhiko Yasuda, Musashino; Shigeo Kato, Katsushika-gun; Hirokazu Uchio, Yokohama, all of Japan

[73] Assignee: Canon Kabushiki Kaisha, Tokyo, Japan

[ * ] Notice: This patent is subject to a terminal disclaimer.

[21] Appl. No.: 08/811,286

[22] Filed: Mar. 4, 1997

Related U.S. Application Data

[62] Division of application No. 08/289,225, Aug. 12, 1994, Pat. No. 5,668,646, which is a division of application No. 08/173,863, Dec. 23, 1993, Pat. No. 5,361,147, which is a continuation of application No. 07/651,030, Feb. 5, 1991, abandoned.

[30] Foreign Application Priority Data

| Feb. 6, 1990 | [JP] | Japan | 2-27658 |
| Jun. 5, 1990 | [JP] | Japan | 2-147035 |
| Jun. 5, 1990 | [JP] | Japan | 2-147036 |
| Sep. 30, 1990 | [JP] | Japan | 2-262798 |
| Sep. 30, 1990 | [JP] | Japan | 2-262799 |

[51] Int. Cl.$^6$ .............. G06K 9/34; G06K 9/46; H04N 1/64
[52] U.S. Cl. .......... 382/164; 382/176; 382/166; 382/239; 358/539; 358/462
[58] Field of Search ............ 382/164, 176, 382/239, 244, 245, 246, 247, 163; 358/539, 530, 515, 462, 426, 427, 261.1, 261.2, 430

[56] References Cited

U.S. PATENT DOCUMENTS

| 4,369,461 | 1/1983 | Tamura | 358/500 |
| 4,446,484 | 5/1984 | Powell . | |
| 4,688,031 | 8/1987 | Haggerty | 358/459 |
| 4,878,125 | 10/1989 | Katayama et al. | 358/443 |
| 4,887,151 | 12/1989 | Wataya . | |
| 4,903,317 | 2/1990 | Nishihara | 358/426 |
| 4,958,218 | 9/1990 | Katayama et al. . | |
| 4,958,238 | 9/1990 | Katayama et al. | 358/456 |
| 4,974,071 | 11/1990 | Maeda | 358/539 |
| 4,975,786 | 12/1990 | Katayama et al. | 358/459 |
| 5,008,950 | 4/1991 | Katayama et al. . | |
| 5,010,580 | 4/1991 | Vincent et al. | 382/163 |
| 5,014,328 | 5/1991 | Rudak | 382/163 |
| 5,068,746 | 11/1991 | Ohsawa et al. | 358/443 |
| 5,086,484 | 2/1992 | Katayama et al. . | |
| 5,089,014 | 2/1992 | Holfert . | |
| 5,089,844 | 2/1992 | Sakai | 355/27 |
| 5,267,333 | 11/1993 | Aono et al. . | |

FOREIGN PATENT DOCUMENTS

| 0163841 | 12/1985 | European Pat. Off. . |
| 0238027 | 9/1987 | European Pat. Off. . |
| 0283715 | 9/1988 | European Pat. Off. . |
| 62-82723 | 4/1987 | Japan . |
| 2-65372 | 3/1990 | Japan . |
| 03192876 | 8/1991 | Japan . |
| 2163026 | 2/1986 | United Kingdom . |

OTHER PUBLICATIONS

"Image Coding Techniques For 64 Kbit/s Channels", K. Grotz, et al., Symposium Record Broadcast Sessions 16th Int'l Symposium, System Session P–2, HDTV Production: Today and Tomorrow, Jun. 17–22, 1989, pp. 387–409.

*Primary Examiner*—Scott Rogers
*Attorney, Agent, or Firm*—Fitzpatrick, Cella, Harper & Scinto

[57] ABSTRACT

This invention relates to an image processing apparatus having a function of encoding or decoding image data and discloses a technique for extracting an image feature, especially a thin image portion of a specific color of an image, and for encoding the thin image portion with high efficiency to minimize degradation of image quality by selecting an appropriate encoding method.

21 Claims, 21 Drawing Sheets

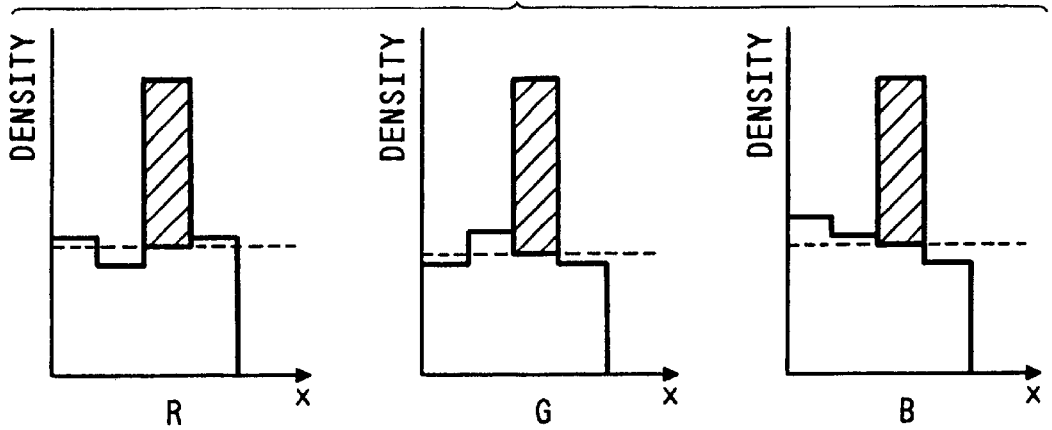

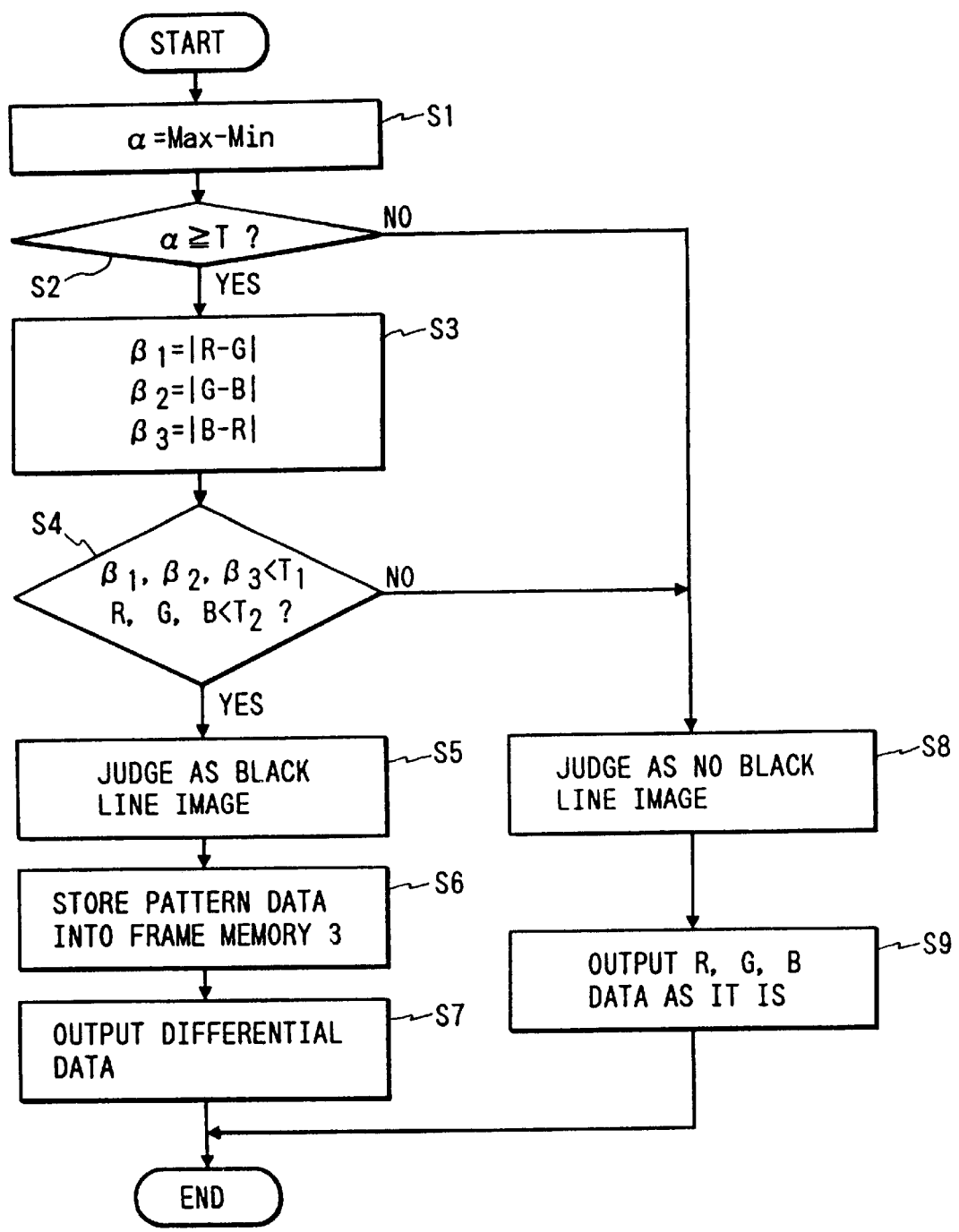

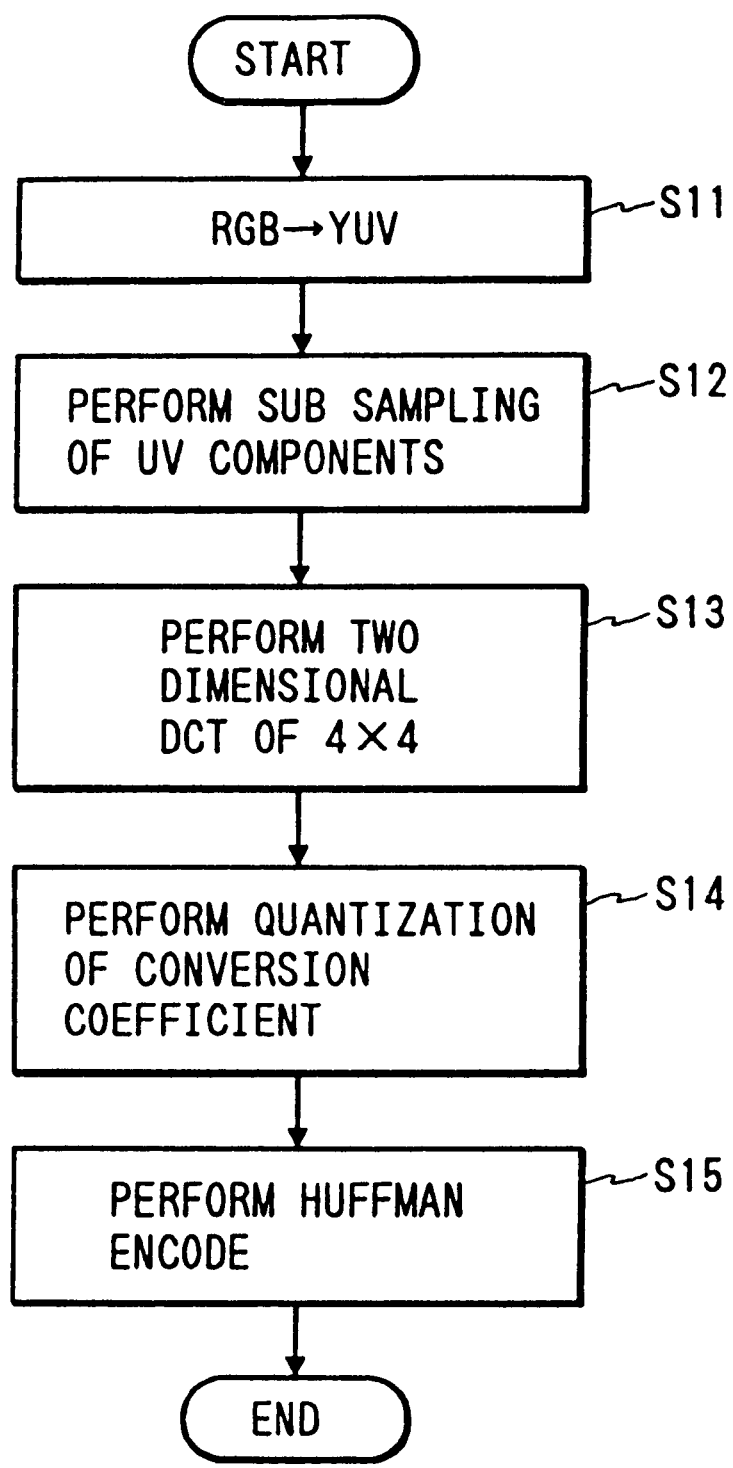

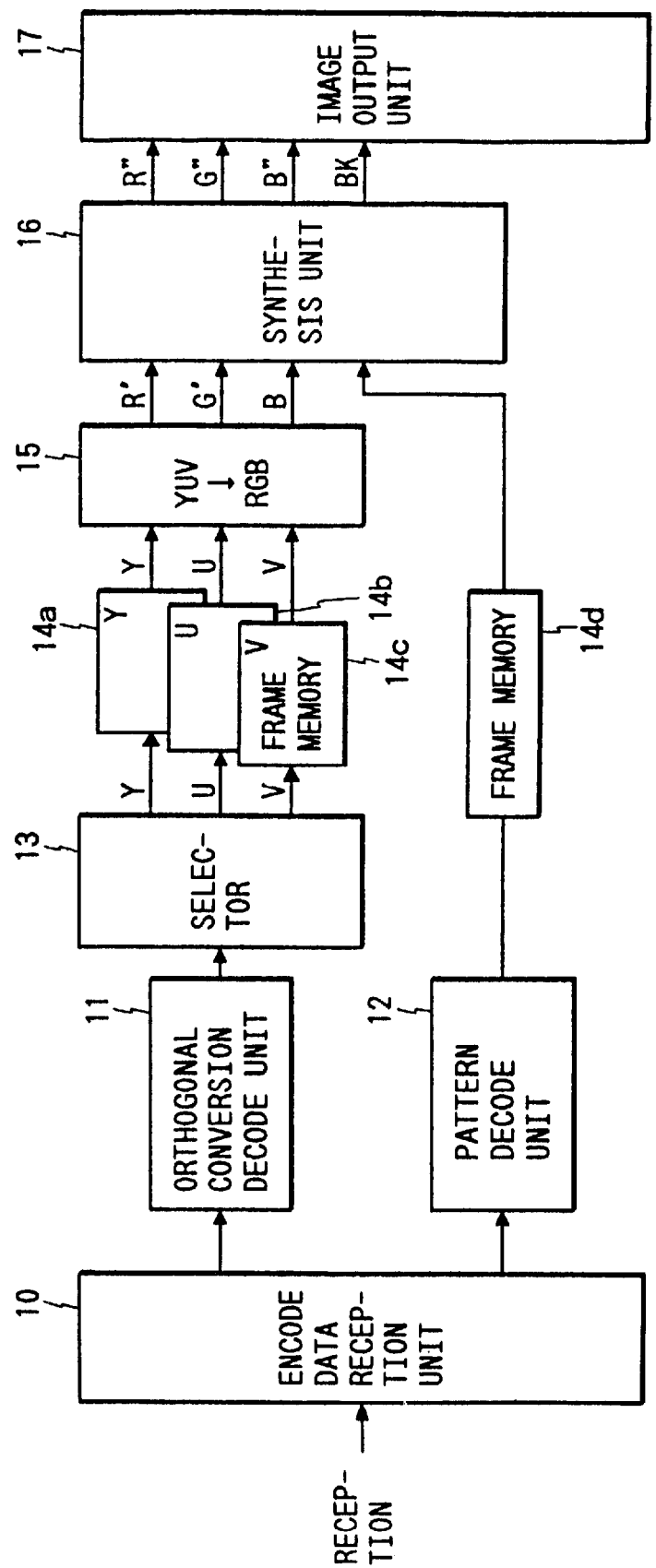

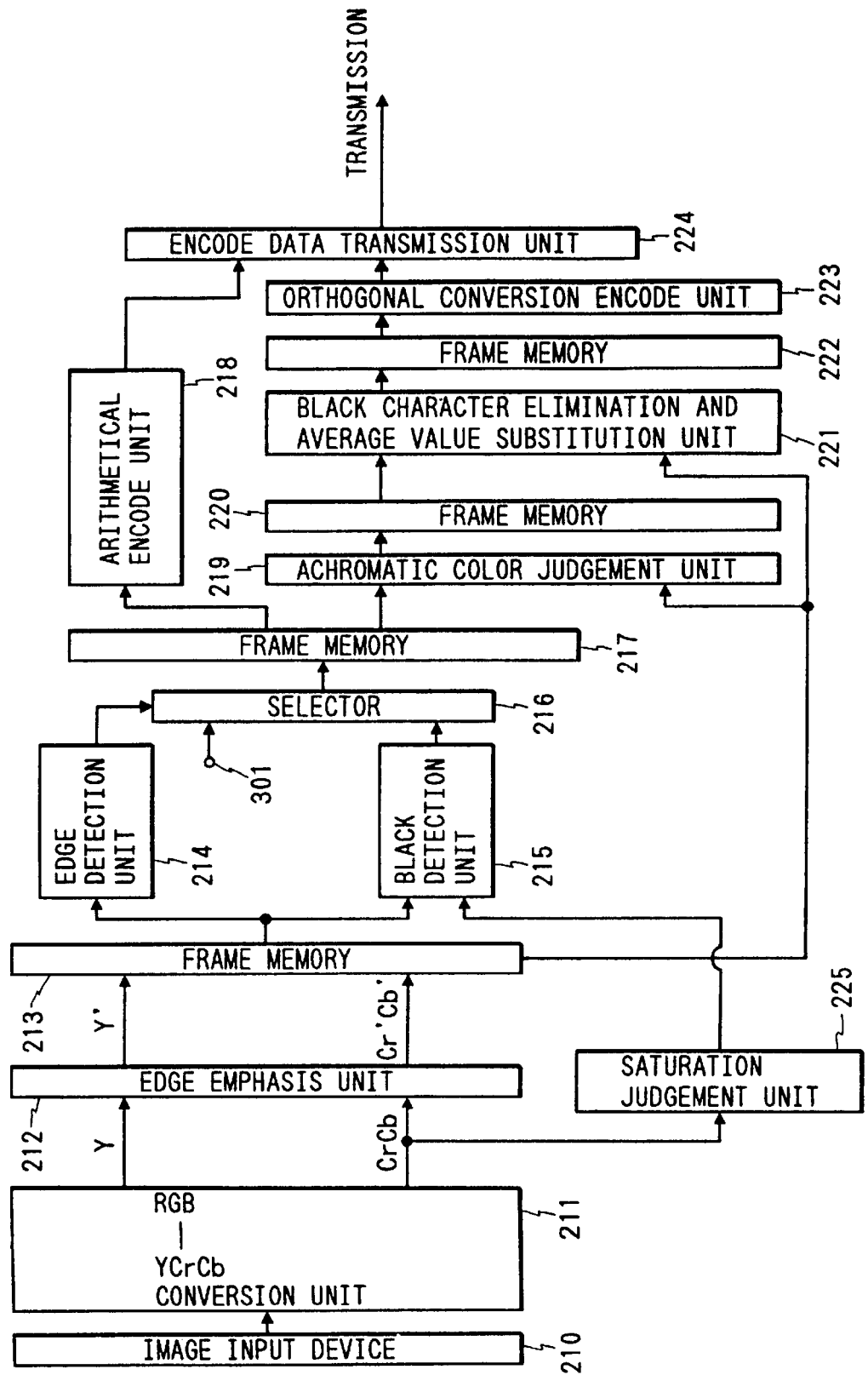

| Y(i-1, j-1) |  | Y(i+1, j-1) |
|---|---|---|
|  | Y(i,j) |  |
| Y(i-1, j+1) |  | Y(i+1, j+1) |

\* ⋯ OBJECTIVE PIXEL

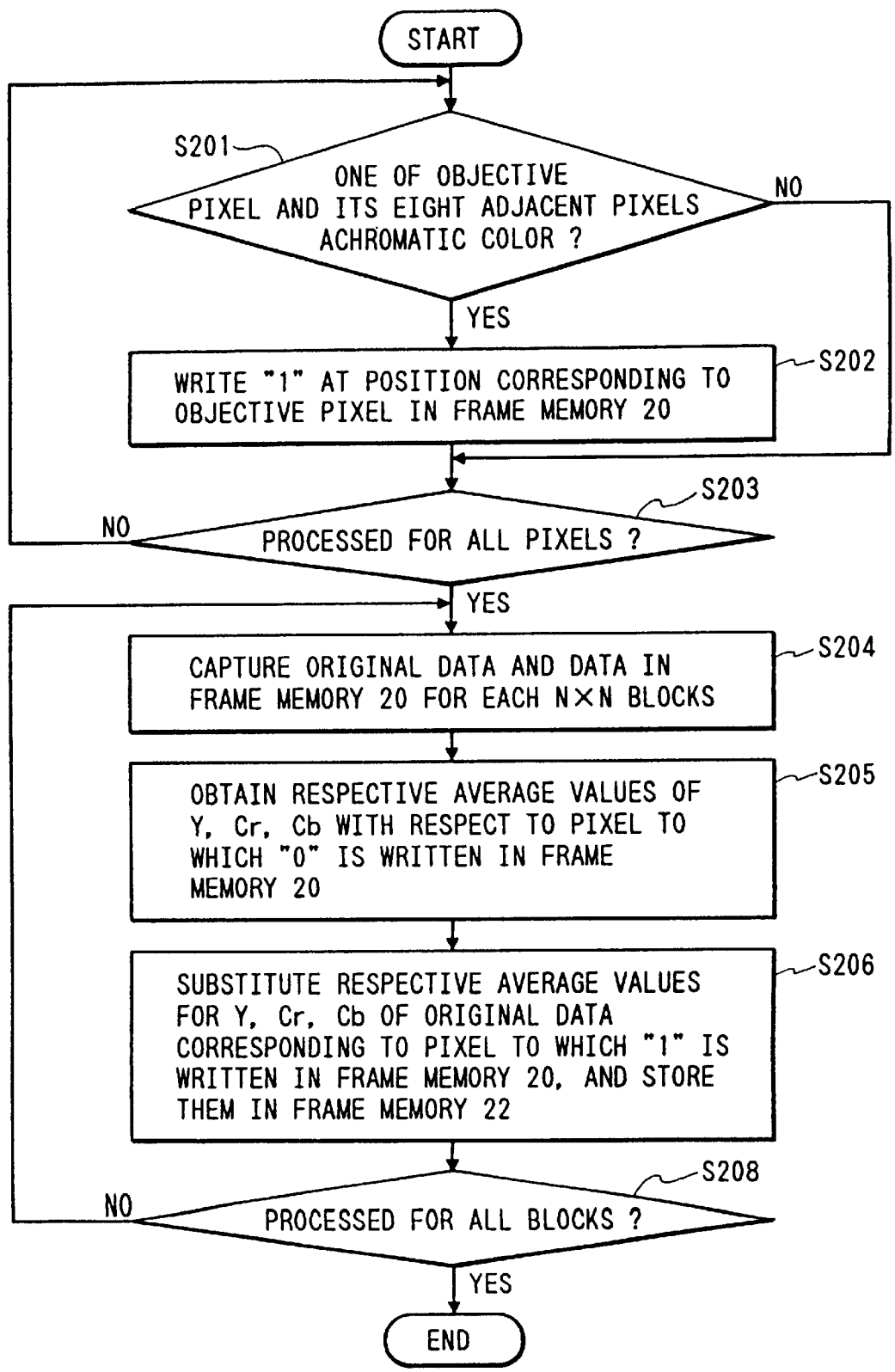

| 4 | 2 | 3 | 6 |
|---|---|---|---|
| 2 | 3 | 4 | 7 |
| 3 | 4 | 8 | 9 |
| 6 | 7 | 9 | 10 |

| 20 | 10 | 5 | 1 |
|---|---|---|---|
| 10 | 9 | 3 | 2 |
| 3 | 3 | 2 | 1 |
| 1 | 2 | 1 | 1 |

| 5 | 5 | 1 | 0 |
|---|---|---|---|
| 5 | 3 | 0 | 0 |
| 1 | 0 | 0 | 0 |
| 0 | 0 | 0 | 0 |

FIG. 20

| 20 | 10 | 3 | 0 |
|----|----|---|---|
| 10 | 9  | 0 | 0 |
| 3  | 0  | 0 | 0 |
| 0  | 0  | 0 | 0 |

FIG. 22

| A |   | B |
|---|---|---|
|   | X |   |
| C |   | D |

| COLOR | R | G | B | BINARY SERIES SIGNAL MSB          LSB | LENGTH OF "0" |
|---|---|---|---|---|---|
| WHITE   | 1 | 1 | 1 | 1 – – – – – –  | 0 |
| BLACK   | 0 | 0 | 0 | 0 1 – – – – –  | 1 |
| RED     | 1 | 0 | 0 | 0 0 1 – – – –  | 2 |
| GREEN   | 0 | 1 | 0 | 0 0 0 1 – – –  | 3 |
| BLUE    | 0 | 0 | 1 | 0 0 0 0 1 – –  | 4 |
| CYAN    | 0 | 1 | 1 | 0 0 0 0 0 1 –  | 5 |
| MAGENTA | 1 | 0 | 1 | 0 0 0 0 0 0 1  | 6 |
| YELLOW  | 0 | 1 | 1 | 0 0 0 0 0 0 0  | 7 |

COLOR IMAGE ENCODING METHOD AND APPARATUS

This application is a division of application Ser. No. 08/289,225 filed Aug. 12, 1994, now U.S. Pat. No. 5,668,646, which is a division of application Ser. No. 08/173,863 filed Dec 23, 1993, now U.S. Pat. No. 5,361,147 which issued on Nov. 1, 1994, which was a continuation of application Ser. No. 07/651,030 filed Feb. 5, 1991, now abandoned.

BACKGROUND OF THE INVENTION

1. Field of the Invention

The present invention relates to an image processing apparatus such as an image encoding apparatus and an image decoding apparatus suitably used in a color copying machine, a color printer, a color facsimile apparatus, a database, or the like.

2. Related Background Art

Methods of dividing an image into blocks, performing orthogonal conversion, and quantizing and encoding coefficients of the orthogonal conversion result are known as conventional methods of encoding color images, as disclosed in U.S. patent application Ser. Nos. 185,024, 261,276, 312,755, and 362,014 filed by the present assignee.

In the conventional examples, since the coefficients are quantized upon orthogonal conversion, high-frequency components are lost, and ringing occurs in edge portions, and particularly, character portions, and blurring occurs in edges of reproduced line image portions such as characters, thereby greatly degrading image quality.

To the contrary, techniques for performing encoding in accordance with whether an input image is an edge portion or not are disclosed in a new U.S. patent application based on Japanese Patent Application No. 1-333836 proposed by the present assignee. With this arrangement, the ringing phenomenon described above can be prevented to obtain a high-quality image.

Even in the above new U.S. application, there is much room for improvement in processing of a line image portion of a specific color among different line image portions.

For example, reproducibility of a black line image portion which is most frequently used in a general document and a general image, that is, reproducibility of a black character is desired to be subjected to special processing since this reproducibility greatly influences image quality.

In Japanese Patent Application Laid-Open No. 62-82723, run length encoding is performed for a "0" run. However, when a specific pattern is included in a block having a predetermined length, this pattern is block-encoded. However, no consideration is taken for the presence of an edge in an image.

When an image obtained by decoding encoded data is to be reproduced as a hard copy of four colors, i.e., Y (yellow), M (magenta), C (cyan), and K (black), a black inking signal is required to print a black line image in only black so as to clearly print the black line image. The processing sequence for the black inking signal is undesirably complicated.

In order to improve quality of a black character portion, it is possible to independently encode a character portion and other portions in accordance with different methods. When only the black character portion is extracted, a peripheral portion of a black character is included in other portions if an image is read from, e.g., an image scanner. The peripheral portion forms an edge portion, and the edge portion causes degradation of orthogonal conversion encoding efficiency.

In a small letter of the Ming type, since a space between horizontal lines in the letter is very small, the space may often be omitted when it is read from an image scanner.

Demand has arisen for providing a method of performing encoding with high efficiency without degrading quality of characters when characters of a plurality of colors are present in an original.

In extraction of a line image portion of a predetermined color of input image data and encoding of this portion independently of other portions, when only the line image portion is simply eliminated, this processing is unsatisfactory due to precision of an extracting means and the like. For example, a high-frequency portion around a color character is left uneliminated. This problem is also posed in image processing except for encoding (e.g., color conversion processing).

SUMMARY OF THE INVENTION

It is an object of the present invention to provide an apparatus capable of eliminating the conventional drawbacks described above, maintaining high image quality, and performing image encoding with high efficiency.

In order to achieve the above object of the present invention, there is provided an image encoding apparatus comprising: input means for inputting image data; discrimination means for discriminating an edge portion of a specific color of the image data input by the input means; and encoding means for performing encoding of the edge portion of the specific color discriminated by the discrimination means in accordance with an encoding method different from that for other portions.

It is another object of the present invention to decode encoded image data to output a reproduced image having high quality.

In order to achieve the above object of the present invention, there is provided an image decoding apparatus comprising: input means for inputting image data encoded by different methods and edge information of the image data; decoding means for decoding the image data in accordance with the edge information of a specific color; and output means for outputting image data decoded by the decoding means.

It is still another object of the present invention to provide an image processing apparatus capable of precisely separating a line image portion of an image from other portions.

In order to achieve the above object of the present invention, there is provided an image processing apparatus comprising: means for emphasizing an edge of input image data; means for detecting a line image portion of a specific color of the input image data; and encoding means for encoding the line image portion of the specific color detected by the detecting means and portions except for the line image portion of the specific color in accordance with different encoding methods.

It is still another object of the present invention to provide an image encoding apparatus suitable for reproducing a black character portion in a color image.

In order to achieve the above object of the present invention, there is provided an image processing apparatus comprising: means for detecting a line image portion of a specific portion of input image data; means for thickening the line image portion of the specific color; and means for encoding the line image portion of the specific color and portions except for the line image portion of the specific color in accordance with different encoding methods.

It is still another object of the present invention to improve reproducibility of a color character.

In order to achieve the above object of the present invention to provide an image processing apparatus comprising: means for extracting line image portions of a plurality of colors of input image data; and means for encoding the line image portions of the plurality of colors extracted from the extracting means and portions except for the line image portions of the plurality of colors in accordance with different encoding methods.

It is still another object of the present invention to improve image quality of portions around color characters.

In order to achieve the above object of the present invention, there is provided an image processing apparatus comprising: first extracting means for extracting a line image portion of a predetermined color of input image data; second extracting means for extracting a portion having a hue similar to the predetermined color; and processing means for modifying the input image data of the portion extracted by the second extracting means.

It is still another object of the present invention to provide an image transmission apparatus having high efficiency.

It is still another object of the present invention to provide an image recording apparatus having high efficiency.

The above and other objects, features, and advantages of the present invention will be apparent from the following detailed description and the appended claims in conjunction with the accompanying drawings.

BRIEF DESCRIPTION OF THE DRAWINGS

FIG. 2 is a view showing a state wherein a black line image portion is subtracted from an input image;

FIG. 3 is a flow chart showing an algorithm of black line image detection;

FIG. 4 is a flow chart of an algorithm of orthogonal conversion encoding;

FIG. 5 is a view showing a quantization matrix;

FIG. 6 is a view showing a coefficient portion upon DCT;

FIG. 7 is a view showing a coefficient portion quantized by the quantization matrix;

FIG. 8 is a block diagram of a decode unit of the image encoding apparatus of the first embodiment of the present invention;

FIG. 9 is a view showing a coefficient obtained by inverse quantization of the coefficient portion shown in FIG. 7;

FIGS. 11A and 11B are block diagrams of an encode unit of an image encoding apparatus according to the second embodiment of the present invention;

FIG. 16 is a flow chart showing a flow of achromatic judgement of a portion around a black character and updating of an average value;

FIG. 20 is a view showing a coefficient obtained by inverse-quantizing the coefficient portion in FIG. 17C;

FIG. 22 is a view for explaining edge detection;

DETAILED DESCRIPTION OF THE PREFERRED EMBODIMENTS

[First Embodiment]

Figure 1:
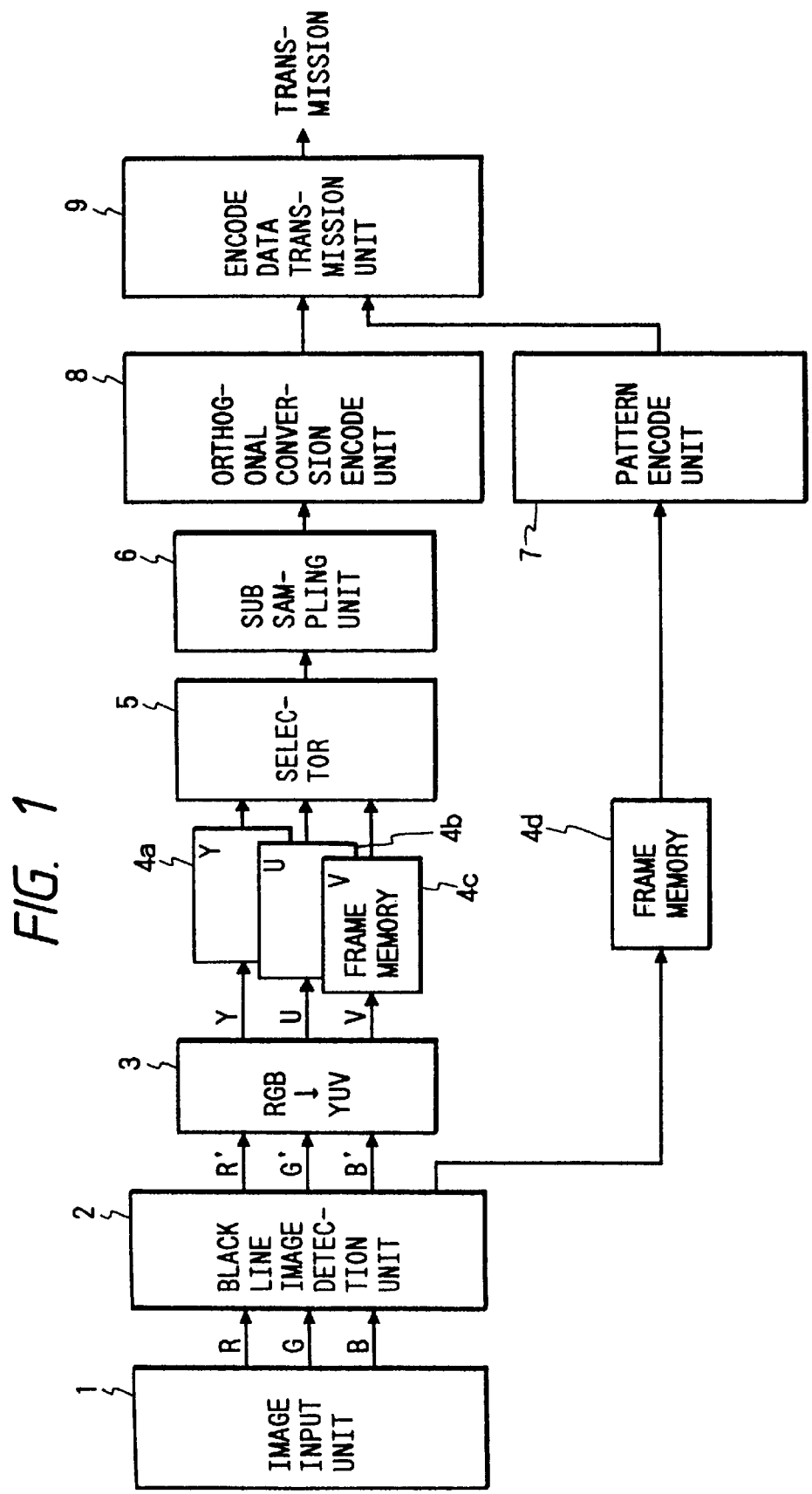
FIG. 1 is a block diagram of an encode unit in an image encoding apparatus according to the first embodiment of the present invention.

FIG. 1 is a block diagram showing an encode unit according to the first embodiment of the present invention.

This encode unit includes an image input unit 1, a black line image detection unit 2 for detecting a line image portion of a specific color, e.g., black, an RGB-YUV conversion unit 3 for converting R, G, and B color components into Y, U, and V color components, frame memories 4a, 4b, and 4c for storing at least one-frame Y,U,V component data, a frame memory 4d for storing pattern information of a black line image detected by the black line image detection unit 2, a selector 5 for selecting one of the Y, U, and V data respectively stored in the frame memories 4a to 4c, a sub sampling unit 6 for performing smoothing of image data, a pattern encode unit 7 for encoding pattern information of the black line image, an orthogonal conversion encode unit 8 for performing orthogonal conversion encoding using DCT (Discrete Cosine Transformation), and an encode data transmission unit 9 for storing and transmitting encoded data. The image input unit 1 is constituted by a color reader (FIG. 10) having a CCD line sensor for reading R, G, and B color components in units of pixels. An arrangement of the color reader will be described later with reference to FIG. 10. R, G, and B input image data are processed by the black line image detection unit 2 as follows. The processing sequence will be described with reference to a flow chart in FIG. 3.

Edge detection is performed in units of blocks (S1 and S2). In this case, one block consists of 4×4 pixels. However, the size of the block is not limited to the 4×4 block. A difference α between a maximum value MAX and a minimum value MIN in a block of each of the R, G, and B colors is calculated (S1). When the difference α exceeds a predetermined value (T=70 (total number of levels is 256)), the presence of an edge is judged (S2).

When the presence of the edge is judged, whether a color is black, i.e., whether the detected edge is a black edge, is judged (S3 and S4). Assume that judgement is performed in an RGB space. In this case, if R, G, and B components of the pixels are almost the same and the R, G, and B levels are smaller than the predetermined value, and if the following conditions are established, an objective image is judged as a black line image:

$$|R-G| < T_1$$
$$|G-B| < T_1$$
$$|B-R| < T_1$$
$$R, G, B < T_2$$

wherein $T_1=20$ and $T_2=50$ (an image is expressed by 8-bit data; black is expressed by level "0", and white is expressed by level "255").

A portion which satisfies the above conditions is judged as a black line image (S5), and this pattern is stored as 1-bit data at a corresponding position in the frame memory 3 (S6).

A difference image except for the black line image portion is created from an input image. As shown in a dotted line a in FIG. 2, an average value of the portions except for the black line image is obtained (this average value is calculated in units of R, G, and B components), and differences between the average values and the R, B, and B components of the black line image, i.e., portions indicated by hatched portions in FIG. 2, are subtracted (S7).

In an M×N block of each of the R, G, and B components, the following calculation is performed:

$$X = \frac{1}{MN-l} \sum_{i=1}^{M} \sum_{j=1}^{N} Xij$$

where l is the number of pixels judged as a black line image, and wherein a pixel judged as the black line image is given as Xij=0.

In this embodiment, M=N=4 is calculated. Data of a pixel judged as a black line image is substituted with an average value X within the block. Data of a pixel judged as not black line image is used as it is.

All pixel data judged as the black line images within a given block are not set to zero, but are substituted with an average values of other data within the given block, and therefore quantization errors occurring upon DCT can be minimized. In addition, encoding efficiency can also be improved. The pixel data need not be replaced with the average value, but can be replaced with any value which is most frequently used.

Image data R', G', and B' obtained by subtracting the differences (hatched portions in FIG. 2) by the black line image detection unit 2 are converted into Y, U, and V components by the RGB-YUV conversion unit 3. These components are stored in the frame memories 4a to 4c in units of Y, U, and V components.

A pixel which is judged not to be a black line image is output to the RGB-YUV conversion unit 3 as it is, i.e., as the data input to the image input unit 1.

Luminance data Y and chrominance data U and V are extracted from the R, G, and B data in the RGB-YUV conversion unit 3 and are stored in the frame memories 4a, 4b, and 4c in units of pixels. The selector 5 selects image data on the basis of an instruction from a CPU (not shown; corresponding to a controller 413 in FIG. 10) so that the Y, U, and V components are frame-sequentially read out in an order of Y, U, and V from the frame memories 4a to 4c.

The Y component passes through the sub sampling unit 6, and the U and V components are sub-sampled into ½ to improve compression efficiency. For example, an average value is calculated in units of 2×2 (pixels) blocks, or a representative value is calculated. Only the U and V components are sub-sampled because the chrominance components U and V are less sensitive to human vision than the luminance component Y.

The orthogonal conversion encode unit 8 performs 4×4 two-dimensional DCT (Discrete Cosine Transform) of the Y, U, and V components of the frame-sequentially input image data to obtain conversion coefficients. The obtained conversion coefficients are quantized by a quantization table shown in FIG. 5. Conversion coefficients obtained by converting original data are shown in FIG. 6, and the quantized coefficients by the quantization table of FIG. 5 are shown in FIG. 7.

More specifically, the conversion coefficients in FIG. 6 are divided by corresponding elements on the matrix of the quantization table of FIG. 5, and fractions are rounded off to obtain the quantization data in FIG. 7. According to orthogonal conversion encoding, the coefficients quantized as shown in FIG. 7 are scanned in a zig-zag manner in a predetermined direction to obtain a Huffman code, thereby sending encoded data to the encode data transmission unit 9. The encoded data are stored in the encode data transmission unit 9.

The above sequence can be performed by computer software on the basis of a flow chart in FIG. 4.

R, G, and B color component data are converted into Y, U, and V components in units of pixels (S11), and the U and V components are sub-sampled in units of 2×2 pixel blocks (S12). The Y, U, and V components are frame-sequentially converted by two-dimensional DCT using a 4×4 pixel block (S13). The obtained conversion coefficients are quantized by using a predetermined quantization table, and zig-zag scanning is performed in units of blocks, thereby performing Huffman encoding (S15). The above encoding algorithm is the same as a so-called ADCT (Adaptive Discrete Cosine Transform) scheme.

By using the above computer software, the encoding scheme described above is used for the image data input from the image input unit 1, thereby accumulating the encoded data at the transmission unit 9.

Pattern information representing a black line image pixel and stored in the frame memory 4d is encoded by the pattern encode unit 7 using invertible encoding such as MR, MMR, or entropy coding (e.g., arithmetic encoding).

The encode data transmission unit 9 transmits a pattern code, first, and then frame-sequentially transmits coded Y, U, V data in an order of Y, U, and V. Prior to frame-sequential transmission, a flag representing correspondence between data and a component is transmitted.

As described above, encoding is performed in accordance with the black line image pattern, thereby keeping high quality of the black line image.

FIG. 8 is a block diagram showing a decode unit for receiving and decoding encoded data.

A pattern code of the encoded data received by an encode data reception unit 10 is decoded as pattern information of a black line image by a pattern decode unit 12, and the decoded data is stored in a frame memory 14d.

Orthogonal conversion decoding is performed by an orthogonal conversion decode unit 11 in a reversed order.

First of all, Huffman-encoded conversion coefficient information is Huffman-decoded. The respective elements in the same quantization table as in FIG. 3 are multiplied with the conversion coefficients in units of 4×4 pixel blocks, and inverse quantization is performed to obtain the conversion coefficients (FIG. 9). Two-dimensional inverse DCT is performed, and a CPU (not shown) switches a selector 13 in accordance with an identification flag constituting part of the received encoded data. The identification flag identifies Y, U, and V components of the data. The resultant image is frame-sequentially stored in one of frame memories 14a to 14c. When all the Y, U, and V data of each pixel are obtained, the Y, U, and V data are read out in units of pixels. The readout data are reproduced by a YUV-RGB conversion unit 15 into R, G, and B data. The pixel levels of the black line image of the reproduced R', G', and B' are substituted with an average value within a predetermined block. The levels are set to be zero by a synthesis unit 16 in accordance with black line image judgement data read out from the frame memory 14d. More specifically, in the pixels of the black line image, the values of other color components R, G, and B are set to zero, and these pixels are set to be completely black. R", G", and B" data obtained upon this processing are sent to an image output unit 17. On the other hand, one-bit black line image judgement data is sent to the image output unit 17 as one-bit BK data.

The image output unit 17 is constituted by, e.g., a laser beam printer, an ink-jet printer, a thermal printer, or a dot printer. At the time of printing, the R", G", and B" data are subjected to RGB-YMC conversion. Since the pixels of the black line image satisfy condition R=G=B=0, condition Y=M=C=0 is established. UCR (Under Color Removal) processing is already realized, and operations such as UCR and black inking which are required for a color hard copy can be advantageously omitted. More specifically, at the time of production of a hard copy, if a black line image pattern signal is given as a black inking signal, black color processing of the black line image can be performed without special processing, thereby improving quality of the black line image.

Figure 10:
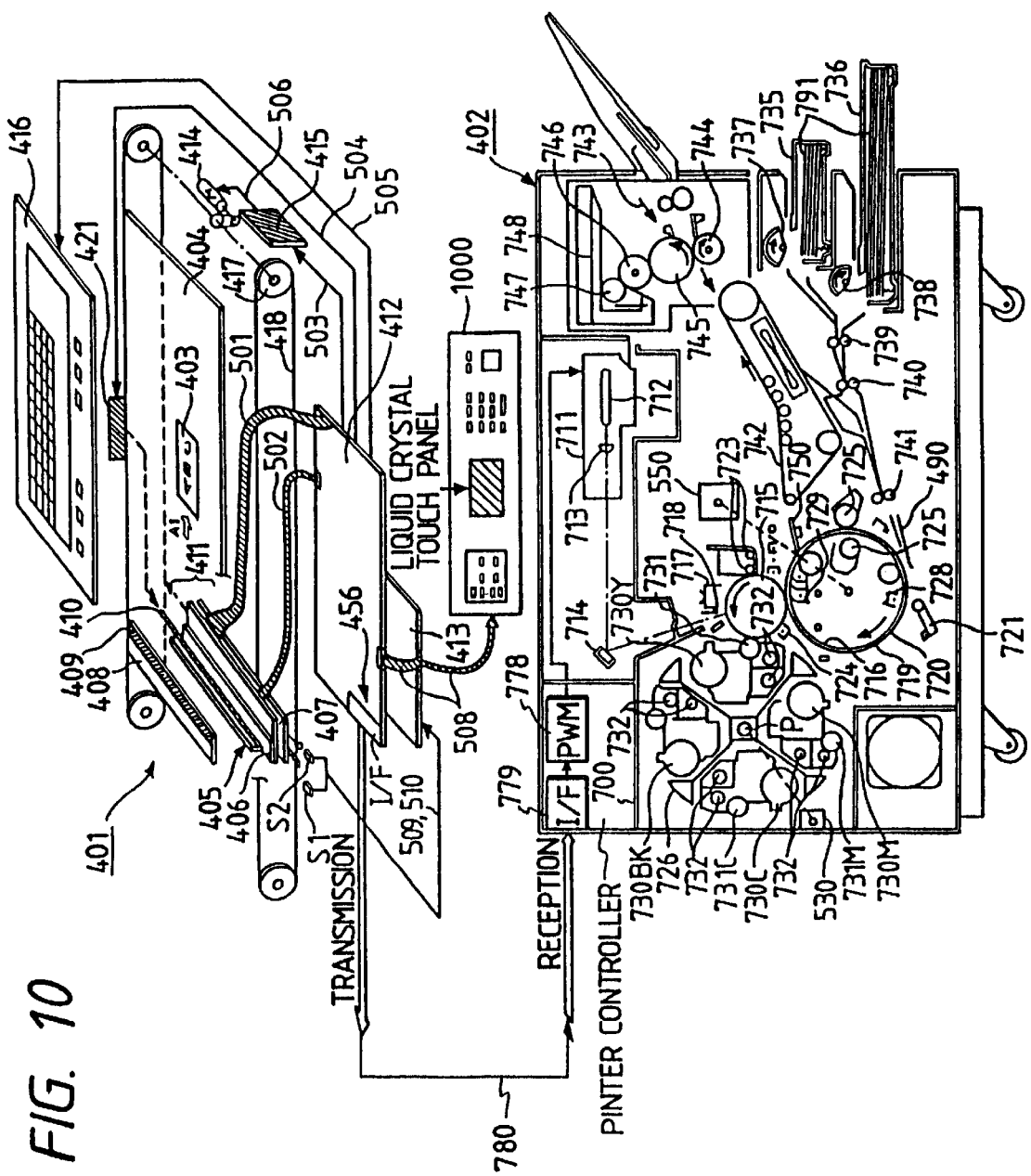
FIG. 10 is a view showing an arrangement of an image processing apparatus which employs the present invention.

FIG. 10 shows a schematic internal arrangement of a digital color image processing system which employs the present invention. This system comprises a transmission digital color image reader (to be referred to as a color reader hereinafter) 401 as an upper unit, and a reception digital color image printer (to be referred to as a color printer hereinafter) 402 as a lower unit. The color reader 401 causes a photoelectric conversion element such as a CCD unit to read color image information of an original in units of colors, photoelectrically converts the read color image information into an electrical digital image signal, and performs encoding described above, thereby sending encoded data. The color printer 402 comprises an electrophotographic laser beam color printer. This printer receives and decodes the encoded data, reproduces a color image in units of colors in accordance with the decoded digital image signal, and records the image on a recording sheet in the form of digital dots upon rotation by a plurality of times.

The overall arrangement of the color reader 401 will be described below.

An original 403 is placed on a platen glass plate 404. A rod array lens 405 focuses an image of light reflected by the original 403 exposed and scanned with a halogen exposure lamp 410 and inputs the optical image on an equal-magnification full color sensor 406. The optical components 405, 406, 407, and 410 integrally constitute an original scanning unit 411 to expose and scan the original in a direction indicated by an arrow A1. A color-separated image signal read line by line during exposure and scanning is amplified to a predetermined voltage by a sensor output signal amplifier 407. The amplified signal is input to a video processing unit (not shown) through a signal line 501, and is processed. A coaxial cable for the signal line 501 assures accurate transmission of a signal. A signal line 502 is used to supply a drive pulse for the equal-magnification full color sensor 406. All necessary drive pulses are generated by a video processing unit 412. White and black boards 408 and 409 are used to correct white and black levels of the image signal. Upon radiation of the white and black boards with the halogen exposure lamp 410, predetermined density signal levels are obtained from these boards, respectively, and are used to perform white level correction and black level correction. The control unit 413 has a microcomputer. The control unit 413 performs display and key input control of an operation panel 1000 and control of the video processing unit 412 through a bus 508, detection control of the position of the original scanning unit 411 by position sensors S1 and S2 through signal lines 509 and 510, stepping motor drive circuit control for pulse-driving a stepping motor 414 for moving a scanning body 11 through a signal line 503, ON/OFF control and light amount control of the halogen exposure lamp 410 through a signal line 504, and control of a digitizer 416, internal keys, and a display unit through a signal line 505, thereby performing overall control of the color reader 401. A color image signal read by the exposure scanning unit 411 at the time of exposure and scanning of the original is input to the video processing unit 412 through the amplifier 407 and the signal line 501. Encoding described above with reference to FIG. 1 is performed in the unit 412, and the encoding result is transmitted to the printer 402 through an interface circuit 56 and the encode data transmission unit 9 in FIG. 1.

The general arrangement of the reception color printer 402 will be described below. A scanner 711 includes a laser output unit for converting an image signal from the color reader 401 into an optical signal, a polygonal mirror 712 consisting of a polygon (e.g., an octagon), a motor (not shown) for rotating this mirror 712, and an f/θ lens (focusing lens) 713. A reflecting mirror 714 changes an optical path of a laser beam. A laser beam output from the laser output unit is reflected by the polygonal mirror 712, passes through the lens 713 and the mirror 714, and is scanned linearly (raster scan) along the surface of a photosensitive drum 715, thereby forming a latent image corresponding to an original image on the surface of the photosensitive drum 715.

A primary charger 711, an entire surface exposure lamp 718, a cleaner 723 for recovering a residual toner which was not transferred to a recording medium, and a transfer precharger 724 are arranged around the photosensitive drum 715.

A developing unit 726 develops a latent image on the surface of the photosensitive drum 715. The developing unit 726 includes developing sleeves 731Y, 731M, 731C, and 731Bk brought into direct contact with the photosensitive drum 715 to perform direct development, toner hoppers 730Y, 730M, 730C, and 730Bk for storing supplementary toners, and screws 732 for transferring the developing agents. These developing unit members are arranged around a rotating shaft P of the developing unit 726. For example, when a yellow toner image is to be formed, yellow toner development is performed at the illustrated position. When a magenta toner image is to be formed, the developing unit 726 is rotated about the shaft P to bring the developing sleeve 731M in the magenta developer to a position where the sleeve 731M is in contact with the photosensitive drum 715. Development of cyan and black components is similarly performed.

A transfer drum 716 transfers a toner image formed on the photosensitive drum 715 to a sheet. An actuator plate 719 is used to detect a position of the transfer drum 716. A position sensor 720 detects that the transfer drum 716 is moved to the home position. The actuator plate 719, the position sensor 720, a transfer drum cleaner 725, a paper press roller 727, and a discharger 729 are arranged around the transfer roller 716.

Sheets are stored in paper cassettes 735 and 736. The sheets are picked up from the cassettes 735 and 736 by paper pickup rollers 737 and 738. Timing rollers 739, 740, and 741 synchronize paper feed and convey timings. Each sheet fed and conveyed by these members is guided to a paper guide 749, and a leading end of the sheet is gripped with grippers (not shown) and is wound around the transfer drum 716, thereby performing an image forming process.

A drum rotation motor 550 synchronously rotates the photosensitive drum 715 and the transfer drum 716. A separation gripper 750 separates the sheet from the transfer drum 716 upon completion of the image formation process. A conveyor belt 742 conveys a sheet separated from the transfer drum 716. An image fixing unit 743 fixes an image on the sheet conveyed by the conveyor belt 742. The image fixing unit 743 has a pair of heat press rollers 744 and 745.

The encoded data transmitted through a communication line 780 is input to an interface I/F 779 in the reception printer 402. Decoding shown in 10 to 16 in FIG. 8 is performed, and the R", G", B", and Bk signals are converted into Y, M, C, and Bk signals. The converted signals are sent to a PWM circuit 778 in an order of Y, M, C, and Bk.

The communication line 780 may be a wired line such as an analog public line or a digital line, or may be a wireless channel such as a satellite communication channel.

In the embodiment described above according to the present invention, a black line image of an input image is detected and is encoded separately. An edge portion, and especially, a black line image portion is patterned in the first image. The edge portion can be encoded separately from a gradation or halftone image portion. Encoding efficiency can be improved while high quality is maintained. More specifically, orthogonal conversion encode processing suitable for encoding of a gradation image is performed for a gradation image. In order to compensate for a drawback wherein a high-frequency component is lost by orthogonal conversion encoding, block encoding is performed for an edge portion and, particularly, a black line image portion which is most frequently used, thereby preventing ringing and allowing reproduction of a black line image with high quality.

Second, since a black line image including high-frequency components is subtracted from an original image, encoding efficiency of orthogonal conversion encoding can be greatly improved, and encoding can be performed using a small amount of data as compared with a case wherein only orthogonal conversion encoding is performed.

Third, since black line image pattern information is used as a black inking signal, color misregistration occurring due to printing of a black line image by a combination of Y, M, and C coloring agents can be prevented. At the same time, UCR and black inking operations required in hard copy reproduction can be omitted, and the circuit arrangement can be simplified. This embodiment is particularly effective in a copying machine.

In this embodiment as described above, a synergetic effect which cannot be obtained by a simple combination of orthogonal encoding and block encoding can be obtained.

In the above embodiment, write and read address control of each frame memory in the above embodiment is performed by a CPU (not shown).

The image input unit is not limited to the CCD line sensor, but can be replaced with a TV camera or still video camera using a CCD area sensor, or an interface for inputting an image from a host computer. The input color component signals are not limited to an RGB system, but can be replaced with a YMC, L*a*b*, YIQ, or YUV system.

The arrangement of the black line image detection unit 2 is not limited to the one described in the above embodiment.

A method of detecting a black character upon completion of RGB-YIQ conversion is also available as another method of detecting a black character. In this case, a system is designed to satisfy the following conditions.

(1) Y (luminance) component is smaller than a predetermined value $T_Y$ ($Y<T_Y$($T_Y$=50 in case of 8-bit data)).

(2) When the IQ (saturation) components are defined as a and b, respectively, the following condition is satisfied:

$$\sqrt{a^2 + b^2} < T_{IQ}$$

wherein $T_Y$=50 and $T_{IQ}$=30. However, the values of $T_Y$ and $T_{IQ}$ are not limited to these values.

If conditions (1) and (2) are satisfied and an edge is present, an input image is judged as a black line image, and the subsequent processing is performed in the same manner as in the black line image detection unit 2 in the above embodiment.

In the above embodiment, the input signal is converted into the luminance component Y and the chrominance components U and V at the time of orthogonal conversion encoding. However, the input signal may be converted into a luminance component L* and chrominance components a* and b* to obtain the same effect as in the above embodiment.

Alternatively, sub sampling may be omitted, and orthogonal conversion encoding may be performed in units of R, G, and B color components.

The orthogonal conversion scheme is not limited to DCT, but may be replaced with an Hadamard transformation.

Black line image pattern encoding may be binary data encoding such as MH, MR, MMR, or arithmetic encoding.

The encode data transmission unit sends a one-frame encoded pattern and frame-sequentially performs orthogonal conversion encoding in an order of Y, U, and V. However, the order of frame-sequential transmission is not limited to this. The Y, U, and V components may be orthogonally converted parallelly, and the Y, U, and V components and an encoded pattern may be transmitted parallelly. In this case, the frame memories may be omitted, and the circuit arrangement can be made simple.

In the above embodiment, a specific color is black. However, the present invention may be applied to another color such as red, blue, or green.

According to the present invention, as has been described above, image data can be compressed with high efficiency while degradation of image quality can be suppressed. The image processing sequence and the circuit arrangement can be simplified.

[Second Embodiment]

The second embodiment to be described below comprises a means for emphasizing an edge of a Y signal so as not to lose achromatic properties around a black character portion, a means for judging a black character, a means for detecting an achromatic portion of several pixels around the black character, and a means for subtracting the black character portion and the achromatic portion from an original image in units of pixels and substituting the subtracted portion with an average value of the surrounding colors. More specifically, after edge emphasis is performed for only the Y signal (luminance signal) of an image, edge judgement is performed in units of blocks, thereby judging a black character. A block which satisfies the above two conditions is judged as a black character block, and the black character block is binarized with a fixed threshold value. This operation is performed for the entire image to create a black character frame. The black character is then considered in units of pixels, and achromaticity of eight surrounding pixels of each pixel constituting a black character is checked. If the surrounding pixels are achromatic, they are regarded to be part of the black character. This frame is regarded as a frame of the portion around the black character independently of the black character frame. The black character frame and the frame of the portion around the black character are subtracted from the original image in units of pixels, and the subtracted portion is substituted with the average value of the surrounding colors. As described above, the black character frame and the natural image frame are formed.

The black character image frame and the natural image frame are encoded by using arithmetic encoding and orthogonal conversion encoding to obtain code data.

This embodiment also comprises a means for judging a black character, a means for detecting an achromatic portion of surrounding pixels of the black character, and a means for subtracting the black character portion and the achromatic portion from the original image in units of pixels, and substituting the subtracted portion with the average value of the surrounding colors. Edge judgement is performed in units of blocks, and the black character is then judged. Any character block which satisfies both the conditions is defined as the black character block. The black character block is binarized by a fixed threshold value. This operation is performed for the entire image to form a black character frame. The black character is then considered in units of pixels. Achromaticity of, e.g., eight surrounding pixels of each pixel constituting the black character is checked. If these pixels are achromatic, they are regarded as part of the black character. This frame is defined as the frame of the portion around the black character independently of the black character frame. The black character frame and the frame of the portion around the black character are subtracted from the original image in units of pixels, and the subtracted portion is replaced with the average value of the surrounding colors. As described above, the black character frame and the natural image frame are formed.

The black character image frame and the natural image frame are encoded by arithmetic encoding and orthogonal conversion encoding, respectively, thereby obtaining code data.

The above processing will be described in detail with reference to the accompanying drawings.

Figure 11A:
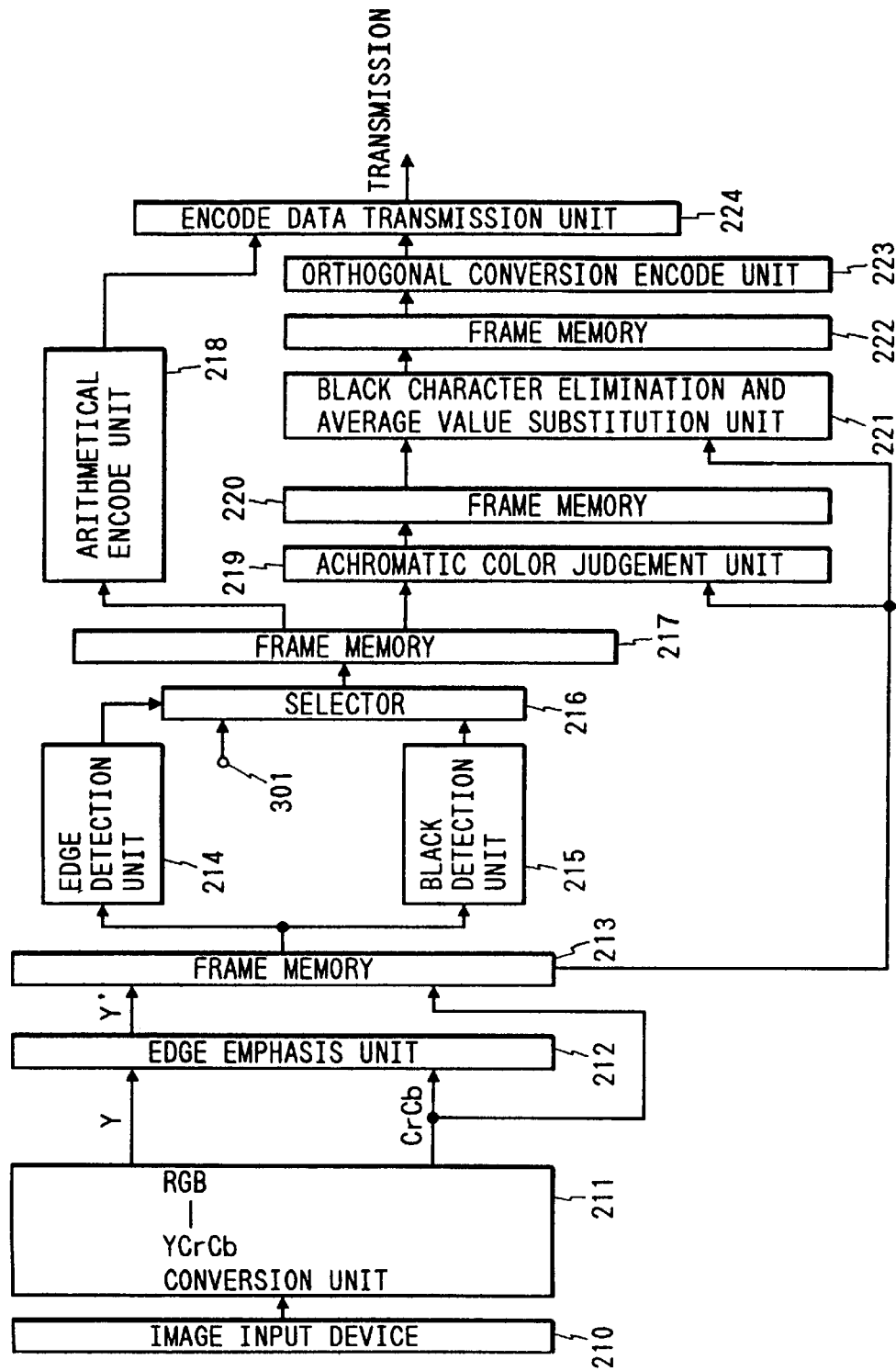

FIGS. 11A and 11B are block diagrams showing the second embodiment of the present invention. An image input device 210 inputs color image data in units of pixels. The apparatus of this embodiment also includes an RGB-YCrCb conversion unit 211, an edge emphasis unit 212, a frame memory 213, an edge detection unit 214, a black detection unit 215, a selector 216, a frame memory 217, an arithmetical encode unit 218, an achromatic color judgement unit 219, a frame memory 220, a black character elimination and average value substitution unit 221, a frame memory 222, an orthogonal conversion encode unit 223, and an encode data transmission unit 224.

RGB data 101 from the image input device 210 is converted based on equation (1) in the RGB-YCrCb conversion unit. Y, Cr, and Cb signals are supplied to the edge emphasis unit 212, and the Cr and Cb signals are directly stored in the frame memory 213.

$$\left.\begin{array}{l} Y = 219.0^*ey + 16 \\ Cr = 0.713^*(R - ey) \\ Cb = 0.564^*(B - ey) \\ ey = 0.299^*R + 0.587^*G + 0.114^*B \end{array}\right\} \quad (1)$$

The edge emphasis unit 212 performs edge emphasis for only the Y signal. The result is output to the frame memory 213. Data in the frame memory 213 is read out in units of blocks (N=4 in this case, but N is preferably set to be an orthogonal conversion block size (to be described later)). The readout data is input to the edge detection unit 214 and the black detection unit 215. The edge detection unit 214 uses only the input Y signal. If a difference between the maximum and minimum values within the block is larger than a predetermined value (i.e., level 70 of 256 levels of the 8-bit structure, but the predetermined value is not limited to this), the presence of an edge is judged. A switching signal of "1" is output to the selector 216. Otherwise, a signal of "0" is output. The edge detection unit 214 continuously outputs the switching signals until black detection of all pixels within the block is completed. Data input to the black detection unit 215 causes to output a signal of "1" for a pixel satisfying both conditions (2) and (3) to the selector. Otherwise, data of "0" is output.

$$Y < T_y1(=50) \qquad (2)$$

$$\left.\begin{array}{l} |Cr - 128| < 15 \\ |Cb - 128| < 15 \\ |Cr - 128| + |Cb - 128| < T_y2(=20) \end{array}\right\} \quad (3)$$

The selector 216 outputs a signal 301 (="0") to the frame memory 217 in response to a switching signal of "0" from the edge detection unit 214 and outputs a signal from the black detection unit 215 to the frame memory 217 in response to the switching signal of "1". In a block having an edge, the signal from the black detection unit 215 is always output to the frame memory 217. If any edge is not, however, present in the block, a signal 301 is output to the frame memory 217. When the above processing is completed, a pixel detected as a black character is stored in the frame memory 217. In the arithmetical encode unit 218, a black character pattern stored in the frame memory 217 is arithmetically encoded, and code data is output to the encode data transmission unit 224. In this embodiment, arithmetic encoding is used as a black character pattern encoding means. However, MH, MR, or MMR may be used in place of arithmetic encoding. The achromatic color judgement unit 219 performs achromatic color judgement of eight surrounding pixels for a black character stored in the frame memory 217. A pixel satisfying conditions (3) and (4) is judged as an achromatic pixel which is then output to the frame memory 220:

$$Y < T_y3(=200) \qquad (4)$$

The black character elimination and average value substitution unit 221 clears values of a portion corresponding to original image data stored in the frame memory 213 when a signal value in the frame memory 220 is set to be "1", i.e., when the signal value represents part of a black character. The corresponding cleared portion is substituted with an average value of pixel values within the block. The orthogonal conversion encode unit 223 performs discrete cosine transform (DCT) for the data output from the black character elimination and average value substitution circuit 221. The encoded data is sent to the encode data transmission unit 224.

The Y signal edge emphasis unit 212 as a characteristic feature of the present invention will be described below.

Figures 12A, 12B:
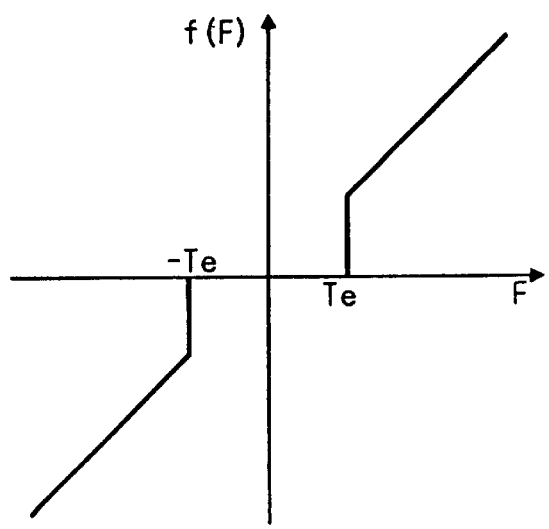
FIGS. 12A and 12B are views for explaining an operation of an edge emphasis unit.

When a thin portion of a character is generally read from a scanner, an edge portion cannot be sharply reproduced. For example, two adjacent horizontal lines of a small character of the Ming type may be combined into a single line. When edge emphasis is to be performed to reproduce an edge sharply, general RGB data read from the scanner does not satisfy condition R=G=B due to precision of the scanner and noise even if an original is perfectly black. When the R, G, and B signal components are edge-emphasized, the variations are increased, and color misregistration occurs in a portion around a black character, thereby changing a hue and hence degrading precision of black character detection. As a result, an edge is left unremoved in the image upon black character removal. This portion causes degradation of orthogonal conversion encoding efficiency. In this embodiment, in order to perform edge emphasis without losing the color balance of the black character portion (i.e., an achromatic portion), edge emphasis is performed (5-A) using the luminance (Y) signal when an objective pixel satisfies condition (3). Otherwise, no processing is performed as in equation (5-B). As shown in FIG. 12B, in order to prevent noise emphasis, if an absolute value of a filter output value F is Te (=30) or less, no edge emphasis is performed (equation (5-D)). In this case, Y(i,j) is the objective pixel, and k is a coefficient for controlling a degree of emphasis. In this example, k=1 is given. However, the emphasis control coefficient is not limited to this. For example, this coefficient may be set in proportion to a value of f(F). FIG. 12A shows the layout of pixels represented by equation (5-C):

$$Y_E(i,j)=Y(i,j)+k*f(F) \quad (5\text{-}A)$$

$$Y_E(i,j)=Y(i,j) \quad (5\text{-}B)$$

$$F=(4*Y(i,j)-Y(i-1,j-1)-Y(i+1,j-1)-Y(i-1,j+1)-Y(i+1,j+1))/4 \quad (5\text{-}C)$$

$$f(F) = \begin{cases} F & |F| > Te \\ 0 & |F| \leq Te \end{cases} \quad (5-D)$$

Edge emphasis is performed as described above, and variations in color components, which have been posed by conventional techniques, can be suppressed. An edge of a black character portion can be made sharp. A portion which is erroneously printed solid by conventional techniques can be clearly reproduced.

Figure 13A:
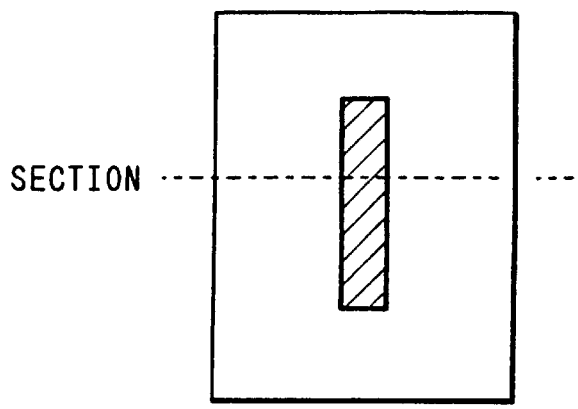
FIGS. 13A to 13D are views showing a state wherein an image is read from a scanner and a state wherein a black character portion is subtracted from an input image.
Figure 13B:
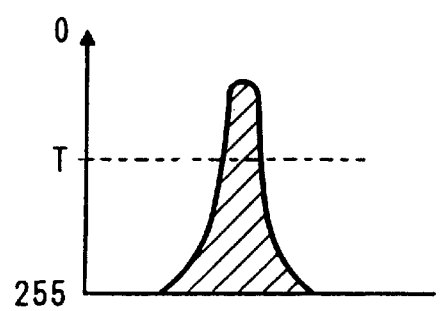
Figure 13C:
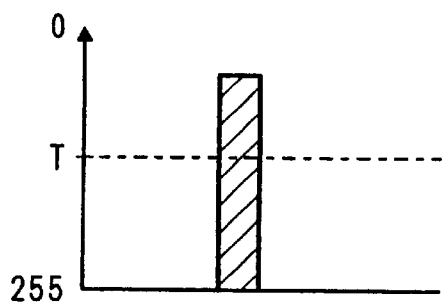
Figure 13D:
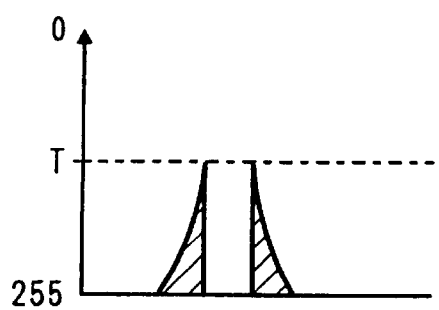

FIG. 13A is a view showing a black character written on a sheet, and FIG. 13B shows a density distribution of a section of a black character read from the scanner. A general image read from the scanner has a rounded edge portion, as shown in FIG. 13B. When this image is binarized with the fixed threshold value T (=50), a conversion result is as shown in FIG. 13C. When this result is subtracted from the original image, a result shown in FIG. 13D is obtained. As is apparent from hatched portions in FIG. 13D, edges are formed again in an image from which a black character is eliminated. When this result is encoded by orthogonal conversion encoding, encoding efficiency is greatly degraded. The edge portions in FIG. 13D are unnecessary from the viewpoint of image quality. These portions are therefor eliminated from the color image and are substituted with the average value of the pixel values in the block. This is one of the characteristic feature of the present invention. More specifically, a portion around the black character is substituted with the average value within the block, and the variations within the block can be reduced. Encoding efficiency upon orthogonal conversion can be improved. The substitution is not limited to the one with the average value, but can be extended to a substitution with a most frequent value. Alternatively, the substitution may be performed using an intermediate value of the pixels within the block using a median filter.

Figure 14A:
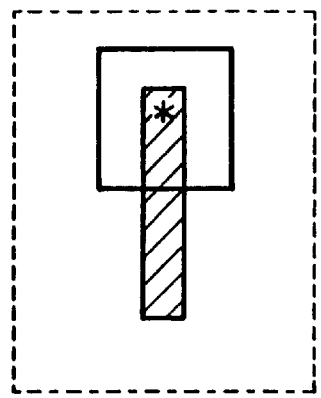
FIGS. 14A to 14C are views showing states wherein an achromatic portion around a black character portion is detected.
Figure 14B:
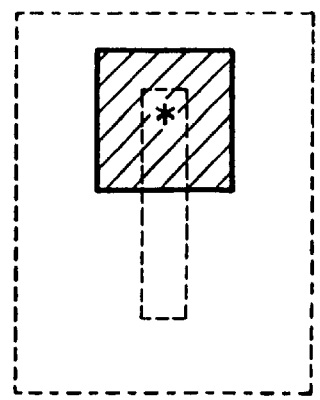
Figure 14C:
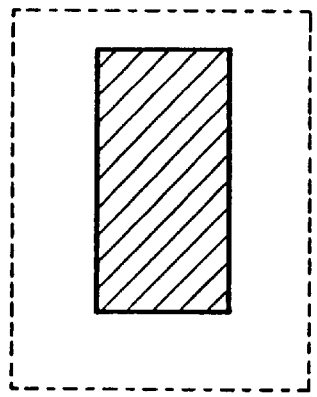

FIGS. 14A, 14B, and 14C are views for explaining an operation of the achromatic color judgement unit 219. A hatched portion in FIG. 14A shows a block character stored in the frame memory 217, and * indicates an objective pixel of the black character. A 3×3 block centered on the * mark indicates an achromatic color judgement area when * is given as the objective pixel. A hatched portion in FIG. 14B is defined as an area judged as an achromatic color for the original image when the * pixel is given as the objective pixel. A hatched portion in FIG. 14C is an area finally judged as a black character and an achromatic portion around the black character. In order to obtain a judgement area signal, values within the 3×3 block are logically ORed. That is, even if at least one achromatic pixel is present within the 3×3 block containing the objective pixel, the objective pixel is judged as an achromatic portion. A hatched portion in FIG. 14C is stored in the frame memory 220. In this case, the block size is not limited to a 3×3 block, but can be replaced with a 5×5 block or a 7×7 block.

Figure 15:
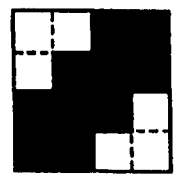
FIG. 15 is a view showing data stored in a frame memory 220.

FIG. 15 is a view for explaining the black character elimination and average value substitution unit 221. As shown in FIG. 15, assume that a black character of a given block and its peripheral achromatic portion (painted portion) are stored in the frame memory 220. The number of painted pixels in FIG. 15 is 10. These ten pixels are replaced with an average value of the remaining pixels within the block by the black character elimination and average value substitution unit 221. More specifically, an average value of the Y signals of the six pixels corresponding to the white portion in FIG. 15, an average value of corresponding Cr signals, and an average value of corresponding Cb signals are obtained, and these average values are substituted into the Y, Cr, and Cb signals of the ten pixels of the black portion in FIG. 15. This processing will be described with reference to a flow chart in FIG. 16.

Achromatic color judgement of eight neighboring pixels of each pixel of the black character data stored in the frame memory 217 is performed (S201). This judgement is performed in accordance with whether conditions (3) and (4) are simultaneously satisfied. When the judgement result represents an achromatic color, data of "1" is written at a corresponding position in the frame memory 220 (S202). In this case, the contents of the frame memory 220 are all "0"s in an initial state. When the above processing is completed for all the pixels (S203), original data (frame memory 213) and data of the frame memory 220 are fetched (S204) in units of N×N blocks (for N=4). Average values of the Y, Cr, and Cb components for the pixels of "0" in the data of the frame memory 220 are calculated (S205). Average values of the Y, Cr, and Cb components of pixels of "1" in the data of the frame memory 220 are defined as the data of these pixels and are stored in the frame memory 222 (S206). The above processing is repeated until the operations in steps S204 to S206 are repeated. When the above processing is completed, the values as the average values are stored for a portion corresponding to the black character. Original data values are stored for a portion except for the portion corresponding to the black character.

Processing in the orthogonal conversion encode unit 223 will be described below. The orthogonal conversion encode unit 223 performs two-dimensional discrete cosine transform using a 4×4 block for image data (frame memory 222) obtained by substituting the black character and its peripheral achromatic portion with the average values within the block, thereby obtaining conversion coefficients. In this case, orthogonal conversion is performed for the Y signals using the 4×4 block. As for Cr and Cb components, in order to improve compression efficiency, the average values within a 2×2 block are calculated and are sub-sampled into ½. The sub-sampled data are divided in units of new 4×4 blocks, and orthogonal conversion is then performed. Only the color components (Cr and Cb) are sub-sampled because these components are less sensitive to human eyes than the luminance component (Y). The obtained conversion coefficients are quantized by a quantization table shown in FIG. 17A. The original data are converted, and the obtained conversion coefficients are as shown in FIG. 17B. Coefficients quantized by the quantization table in FIG. 17A are shown in FIG. 17C.

Figures 17A, 17B, 17C, 18:
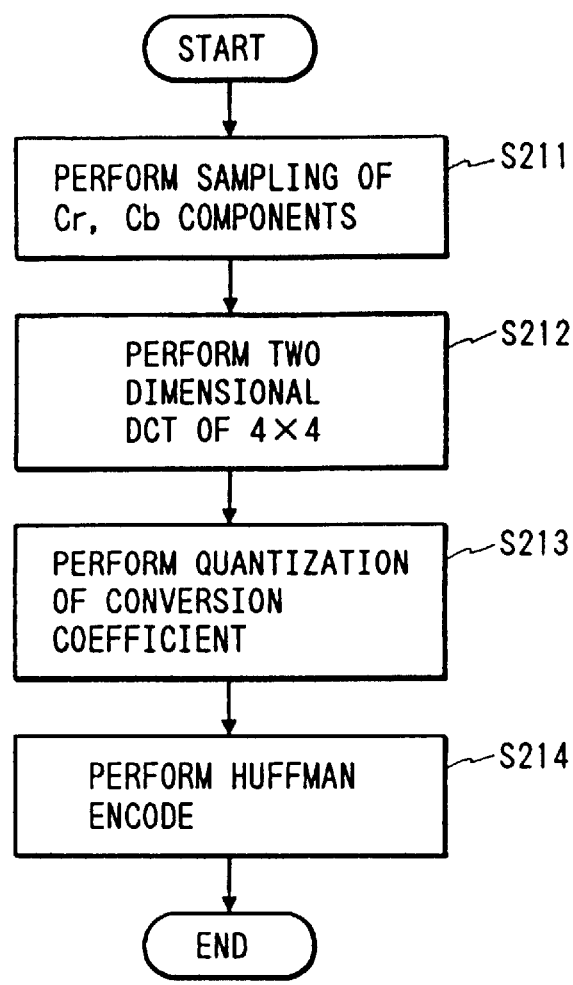
FIGS. 17A to 17C are views showing a quantization coefficient, a conversion coefficient, and a conversion coefficient quantization result.
FIG. 18 is a flow chart showing an algorithm of orthogonal conversion encoding.

More specifically, the conversion coefficients in FIG. 17B are divided by the elements of the quantization table corresponding to the matrix in FIG. 17A, and the fractions are rounded off to obtain the quantization data shown in FIG. 17C. According to orthogonal conversion encoding, the coefficients quantized as shown in FIG. 17C are zig-zag scanned to obtain Huffman codes which are then transmitted to the encode data transmission unit 224.

The above sequence can be performed by computer software on the basis of a flow chart in FIG. 18.

In the encode data transmission unit 224, a black character pattern code is sent first, and Y, Cr, and Cb code data are frame-sequentially transmitted. Prior to transmission of each frame, a flag representing correspondence between the data and the component is transmitted.

As described above, the black character patterns are entirely encoded, and quality of the black character can be maintained. When a black character is to be separated from original data, the black character portion including its peripheral portion is substituted with an average value within the block, thereby improving orthogonal conversion encoding efficiency.

Figure 19:
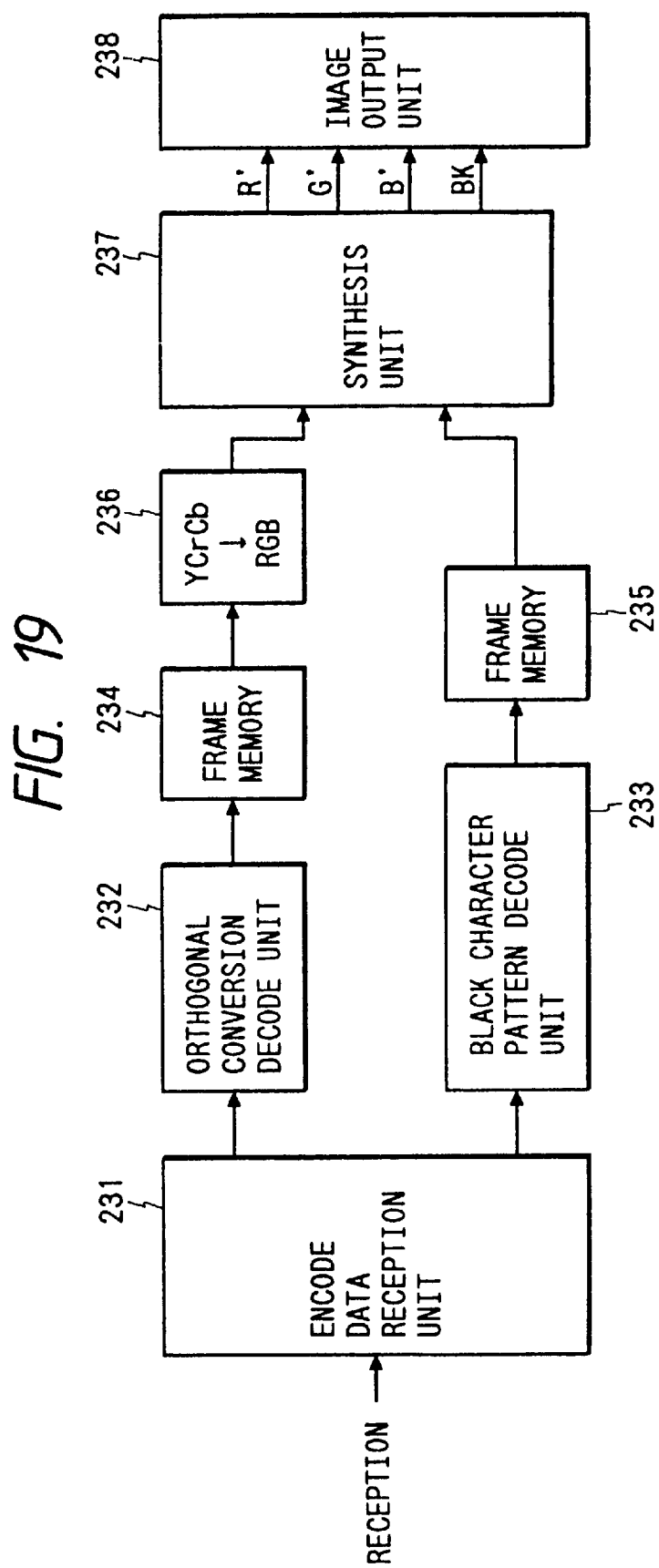
FIG. 19 is a block diagram of a decode unit of the image encoding apparatus of the second embodiment of the present invention.

FIG. 19 is a block diagram showing an encode unit for encoding coded data.

In an encode data reception unit 231, a pattern code of the coded data received by this unit 231 is decoded by a black character pattern decode unit 233 as black character pattern information. The decoded data is stored in a frame memory 235.

Figures 20, 22:
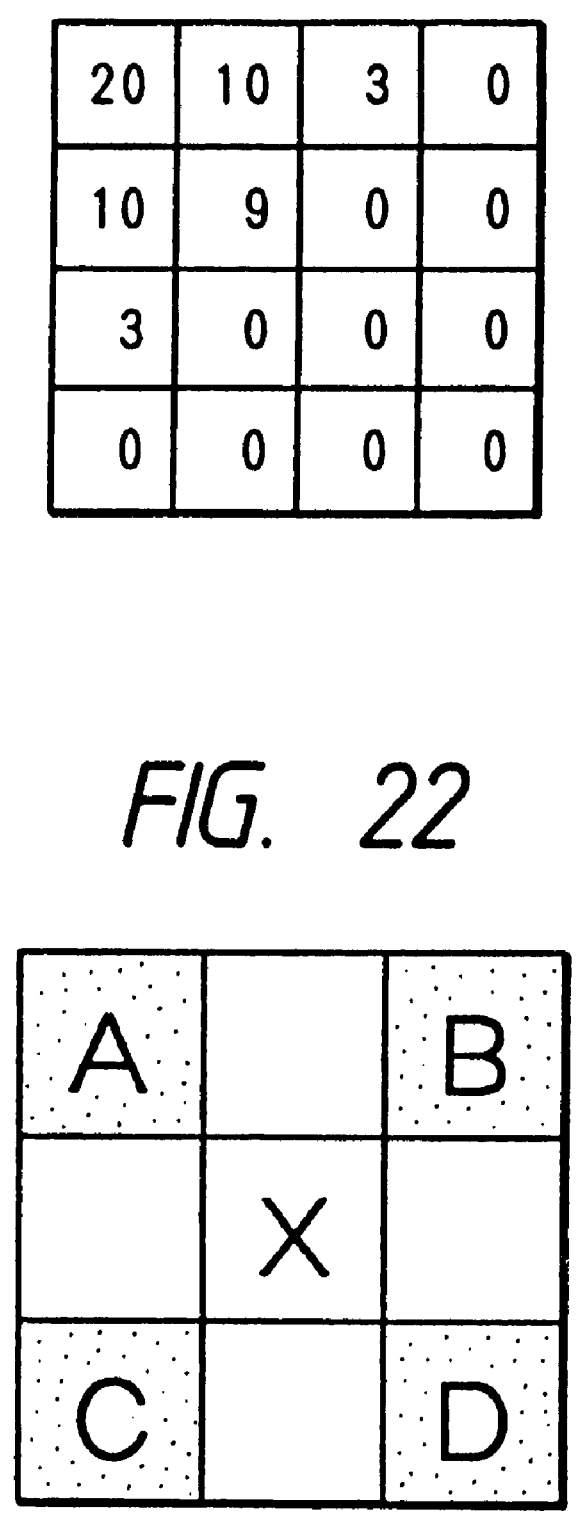

Orthogonal conversion decoding is performed in a reversed order to orthogonal conversion encoding by an orthogonal conversion decode unit 232. First of all, the quantized conversion coefficient data are decoded, and the decoded data are multiplied with the corresponding elements of the quantization table shown in FIG. 17A, thereby performing inverse quantization and hence obtaining conversion coefficients (FIG. 20). The conversion coefficients are subjected to two-dimensional inverse discrete cosine transform, and the resultant image is stored in a frame memory 234. When all the Y, Cr, and Cb data are obtained, the Cr and Cb data are restored to have the same size as the original data by simple interpolation or linear interpolation since the Cr and Cb data are sub-sampled into ½. The Y, Cr, and Cb data are read out in units of pixels, thereby restoring R, G, and B data in units of pixels, as indicated by equations (6):

$$\left.\begin{array}{l} R = Y + \dfrac{(Cr - 128)}{0.713} \\ B = Y + \dfrac{(Cb - 128)}{0.564} \\ G = \dfrac{(Y - 0.299^* R - 0.144^* B)}{0.587} \end{array}\right\} \quad (6)$$

Although the pixel values of the black character portion of the restored data are substituted with the average values within the predetermined block, the levels of the black character data read out from the frame memory 235 are set to be zero by a synthesis unit 237. More specifically, other color component (R, G and B) values are set to zero to obtain perfect black for the black character portion. The resultant r, g, and b data are sent to an image output unit 238. On the other hand, one-bit black character data is sent to the image output unit 238 as 1-bit BK data.

The image output unit 238 is constituted by a laser beam printer, an ink-jet printer, a thermal printer, or a dot printer. At the time of printing, the r, g, and b data are subjected to RGB-YMC conversion. Since the pixels of the black line image satisfy condition R=G=B=0, condition Y=M=C=0 is established. UCR (Under Color Removal) processing is already realized, and operations such as UCR and black inking which are required for a color hard copy can be advantageously omitted. More specifically, at the time of production of a hard copy, if a black line image pattern signal is given as a black inking signal, black color processing of the black line image can be performed without special processing, thereby improving quality of the black line image.

According to this embodiment, as described above, only the edge of the achromatic portion can be emphasized without losing the color balance by using the luminance (Y) signal. A thin portion of a black character read as a solid portion at the time of image input can be sharply reproduced. Therefore, detection precision of the black character pattern can be improved.

According to this embodiment, a black character portion of an input image is detected and is separately encoded. An edge portion, and especially, a black line image portion is patterned in the first image. The edge portion can be encoded separately from a gradation or halftone image portion. Encoding efficiency can be improved while high quality is maintained. More specifically, orthogonal conversion encode processing suitable for encoding of a gradation image is performed for a gradation image. In order to compensate for a drawback wherein a high-frequency component is lost by orthogonal conversion encoding, block encoding is performed for an edge portion and, particularly, a black line image portion which is most frequently used, thereby preventing ringing and allowing reproduction of a black line image with high quality.

Second, in addition to the black character portion, the achromatic portion around the black character portion is eliminated from a gradation image, and the eliminated portion is substituted with the average value within the block. Therefore, orthogonal conversion encoding efficiency can be greatly improved, and encoding can be performed using a small amount of data as compared with the case using only orthogonal conversion encoding.

Third, since black line image pattern information is used as a black inking signal, color misregistration occurring due to printing of a black line image by a combination of Y, M, and C coloring agents can be prevented. At the same time, UCR and black inking operations required in hard copy reproduction can be omitted, and the circuit arrangement can be simplified. This embodiment is particularly effective in a copying machine.

In this embodiment as described above, a synergetic effect which cannot be obtained by a simple combination of orthogonal encoding and block encoding can be obtained.

In the above embodiment, write and read address control of each frame memory in the above embodiment is performed by a CPU (not shown).

The numeric values in the above embodiment are not limited to the specific ones described above.

The image input unit is not limited to the CCD line sensor, but can be replaced with a TV camera or still video camera using a CCD area sensor, or an interface for inputting an image from a host computer. The input color component signals are not limited to an RGB system, but can be replaced with a YMC, L*a*b*, YIQ, or YUV system.

The arrangement of the black line image detection unit 215 is not limited to the one described in the above embodiment. For example, R, G, and B signals may be directly used to perform black detection. In this case, a system may be designed to satisfy the following conditions:

(1) The overall level is low.

$$R, G, B < T_y (T_y = 50)$$

(2) Level differences of the R, G, and B components are small (close to achromatic colors):

$$|R-G| < Tc (=30)$$
$$|G-B| < Tc$$
$$|B-R| < Tc$$

In this case, $T_y$ and $T_c$ values are set to be $T_y=50$ and $T_c=30$, but are not limited to these values.

In the above embodiment, the input signal is converted into the luminance component Y and the chrominance components Cr and Cb at the time of orthogonal conversion encoding. However, the input signal may be converted into a luminance component L* and chrominance components a* and b* or into a luminance signal Y and chrominance signals I and Q or U and V to obtain the same effect as in the above embodiment.

Alternatively, sub sampling may be omitted, and orthogonal conversion encoding may be performed in units of R, G, and B color components.

The orthogonal conversion scheme is not limited to DCT, but may be replaced with an Hadamard transformation or discrete sine transform.

Black line image pattern encoding may be binary data encoding such as MH, MR, MMR, or static or dynamic arithmetic encoding.

The encode data transmission unit transmits a one-frame encoded pattern and then frame-sequentially performs orthogonal conversion encoding in an order of Y, Cr, and Cb. However, the order of frame-sequential encoding is not limited to this. The Y, Cr, and Cb components may be encoded as parallel data in accordance with orthogonal conversion encoding, and the Y, Cr, and Cb components and the encoded pattern may be sent parallelly. In this case, the frame memory can be omitted, thereby simplifying the circuit arrangement.

In the above embodiment, edge emphasis is performed for only the luminance component. However, as shown in FIG. 11B, a separate saturation judgement unit 225 for performing saturation judgement of equation (3) may be arranged to judge the Cr and Cb signals prior to edge emphasis. A judgement signal may be then sent to the black detection unit 215, thereby performing edge emphasis of all components containing chrominance components.

On the basis of the same principle described above, edge emphasis may be performed for the R, G, and B signals.

In the above embodiment, a specific color is black as a typical example of the black line image portion. The present invention is not limited to characters but may be extended to thin line portions including black portions.

The black line image portion may be a line image portion having a slightly different hue such as dark blue or gray, or a line image portion having a totally different hue such as red, blue, or green.

According to the present invention, as has been described above, image data can be compressed with high efficiency while degradation of image quality can be suppressed.

[Third Embodiment]

Figure 21:
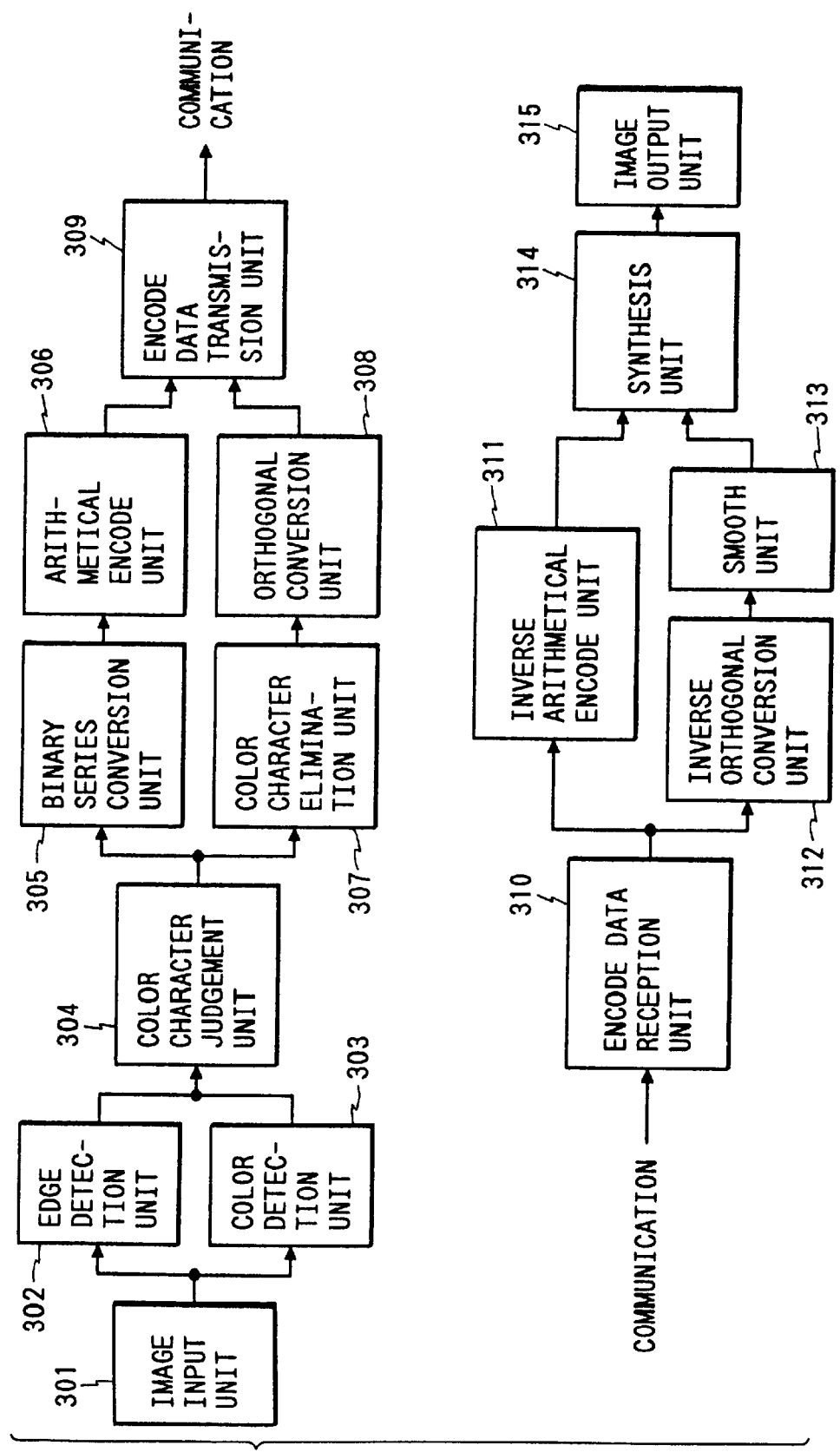
FIG. 21 is a block diagram of an encoding apparatus according to the third embodiment of the present invention.

FIG. 21 is a block diagram showing an overall arrangement of an image encoding apparatus according to the third embodiment of the present invention.

Referring to FIG. 21, an image input unit 301 inputs an image signal representing an original and comprises an image sensor for causing a CCD line sensor to scan the original and outputting 8-bit color component signals, i.e., R (red), G (green), and B (blue) as 8-bit data. An edge detection unit 302 detects a high-frequency component portion of an original image in accordance with a method (to be described later). A color detection unit 303 detects pixels of a predetermined color component. A color character judgement unit 304 judges a pixel of an edge portion and a predetermined color component. A binary series conversion unit 305 converts pixel data representing a plurality of colors into a binary series signal suitable for arithmetic conversion. The binary series signal is encoded by dynamic arithmetic encoding by an arithmetical encode unit 306. A color character elimination unit 307 substitutes pixel data judged as a color character with average value data of a block to which this pixel belongs. An orthogonal conversion unit 308 performs DCT (Discrete Cosine Transform) in units of blocks and further performs Huffman encoding, i.e., performs so-called TDCT encoding. An encode data transmission unit 309 synthesizes outputs from the arithmetic encode unit 306 and the orthogonal conversion unit 308 to generate encoded data to be transmitted.

An encode data reception unit 310 separates the received encoded data into an arithmetic code and a Huffman code. An inverse arithmetical encode unit 311 decodes the arithmetic code and outputs color character data. An inverse orthogonal conversion unit 312 performs Huffman decoding and inverse orthogonal conversion and outputs multivalue image data. A smooth unit 313 performs smoothing to eliminate block distortion of the decoded image. A synthesis unit 314 synthesizes a color character and multivalue image data and outputs image data to be reproduced. An image output unit 315 outputs image data as a visible image.

The respective components will be described below.

<Edge Detection Unit 302>

In the edge detection unit 302, the following operations are performed between peripheral pixels A, B, C, and D for an objective pixel X, as shown in FIG. 22, to calculate a distance between two points in the RGB space, thereby detecting an edge in the image. That is, if image data of the objective pixel and its surrounding pixels are given as (Xr,Xg,Xb) and (Ar,Ag, and Ab), an edge is judged between X and A if the following conditions are satisfied:

$$S=((Xr-Ar)^2+(Xg-Ag)^2(Xb-Ab)^2)^{1/2} \quad (1)$$

$$S>TH1(=100) \quad (2)$$

Similarly, the presence/absence of an edge is judged between B, C, and D. If any one of A, B, C, and D is judged to be an edge, the objective pixel X is judged as an edge.

In this manner, a distance between the objective pixel and each surrounding pixel in the three-dimensional color space is calculated to judge the presence/absence of an edge. For example, a color edge having a different luminance, hue, or saturation can be judged. Therefore, the present invention is very effective to detect a color character.

In addition to edge judgement of each pixel, whether an edge image is included in an 8×8 pixel block for performing color character elimination and orthogonal conversion (both will be described in detail later) is judged. A judgement signal is output.

A technique for selecting surrounding pixels is not limited to the one described above. For example, eight surrounding pixels may be selected.

For example, an average value of image data of A, B, C, and D is calculated, and the above arithmetic operation is performed between the average value and the pixel X.

<Color Detection Unit 303>

The color detection unit 303 performs detection of a plurality of predetermined colors by the following condition. Assume that image data is (r,g,b). If $$r, g, b<th1 \text{ and}$$

$$|r-g|, |g-b|, |b-r|<th3 \quad (3)$$

an objective pixel X is judged as K (black).
Similarly, if $$r>th2 \text{ and } g, b<th1, \text{ and}$$

$$|g-b|<th3 \quad (4)$$

then X=R (red)
If $$g>th2, r, b<th1, \text{ and } |r-b|<th3 \quad (5)$$

then X=G (green).
If $$b>th2, r, g<th1, \text{ and } |r-g|<th3 \quad (6)$$

then X=B (blue).
If $$r, g>th2, b<th1, \text{ and } |r-g|<th3 \quad (7)$$

then X=Y (yellow).
If $$r, b>th2, g<th1, \text{ and } |r-b|<th3 \quad (8)$$

then X=M (magenta).
If $$g, b>th2, r<th1, \text{ and } |g-b|<th3 \quad (9)$$

then X=C (cyan), thereby performing color detection.

In this case, th1, th2, and th3 are predetermined threshold values. For example, if th1=50, th2=205, and th3=30, then a good detection result can be obtained.

Figures 23, 24:
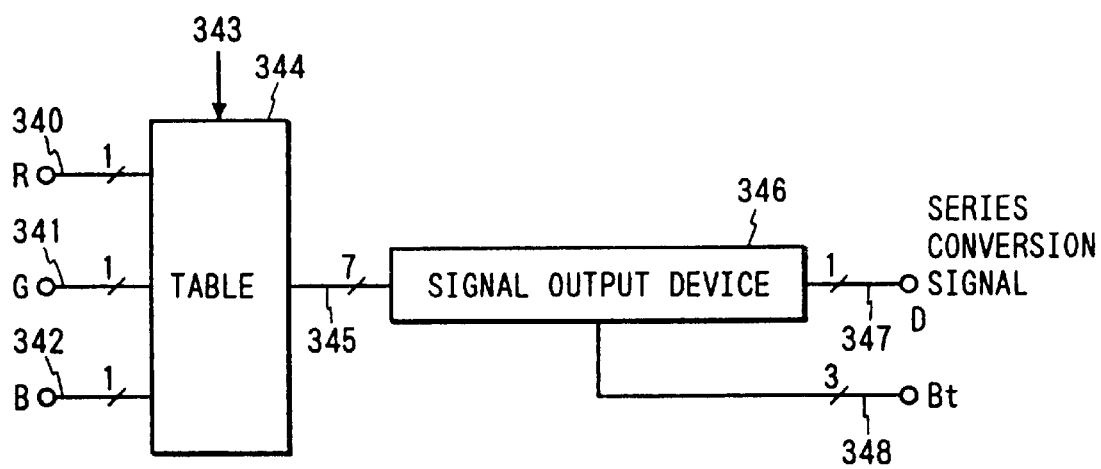
FIG. 23 is a view for explaining binary series conversion.
FIG. 24 is a block diagram showing an arrangement of a binary series conversion unit.

A color detection signal is expressed by a 3-bit signal (R, G, and B), and a correspondence between each detection color and each R, G, or B value is shown in FIG. 23.

<Color Character Judgement Unit 304>

The color character judgement unit 304 judges as a color character a pixel which corresponds to the edge detected by the edge detection unit 302 and which satisfies one of conditions (3) to (9) described above.

<Binary Series Conversion Unit 305>

The binary series conversion unit 305 converts 8 color signals represented by 3-bit color character judgement signals into the binary series signal shown in FIG. 23.

The block diagram of the binary series conversion unit 305 is shown in FIG. 24. Input data 340 to 342 are converted by a conversion table 344 of a RAM or the like into a signal of a maximum of seven bits shown in FIG. 23 in units of pixels, and are input to a signal output device 346. A plurality of ROMs may be prepared to assign a short bit length to a color which frequently appears in a conversion table 344, and one of the plurality of ROMs may be selected in response to a control signal 343.

The signal output device 346 has a shift register structure. 7-bit parallel input signals 345 are input to the signal output device 346 and are output bit by bit serially. This is a binary series signal D347. When the binary series signal is set at "1" or seven "0"s are output, the signal output device 346 stops outputting a one-pixel color signal and receives the next data. The signal output device 346 also outputs a signal Bt348 representing which bit corresponds to the currently output bit.

In this manner, the 3-bit color character judgement signal is converted by binary series conversion to output it as a one-bit serial signal, thereby performing encoding. Encoding can be performed without encoding 3-bit signals separately from each other while hue correlation is maintained. In addition, when encoding is to be performed while the objective pixel is predicted, as in arithmetic encoding, prediction and encoding are performed as color information without performing prediction and encoding in units of color components, i.e., R, G, and B components, thereby improving encoding efficiency.

Since the R, G, and B components representing colors of each pixel can be represented by one data, one data is decoded at the time of decoding operation, and the R, G, and B signals corresponding to each signal can be simultaneously obtained, so that a color image can be reproduced at high speed.

<Arithmetical Encode Unit 306>

The arithmetical encode unit 306 encodes a binary series signal representing the number of colors in accordance with arithmetic encoding serving as inverse encoding. A method and circuit arrangement of arithmetic encoding is as described in Japanese Unexamined Patent Publication (Kokai) No. 2-65372.

<Color Character Elimination Unit 307>

The color character elimination unit 307 substitutes data of an objective pixel judged as a color character by the color character judgement unit 304 with a value corresponding to data of other pixels within the block which contains the objective pixel.

Figure 25A:
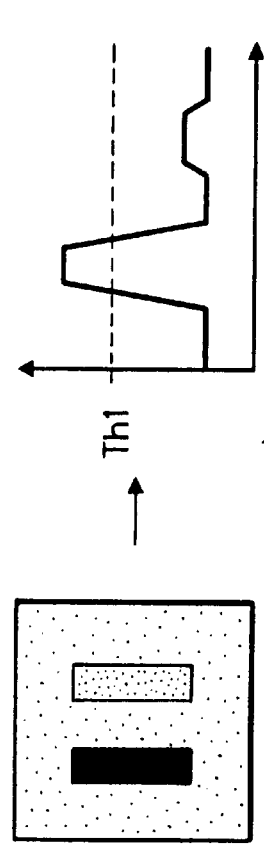
FIGS. 25A to 25C are views for explaining color character elimination.
Figure 25B:
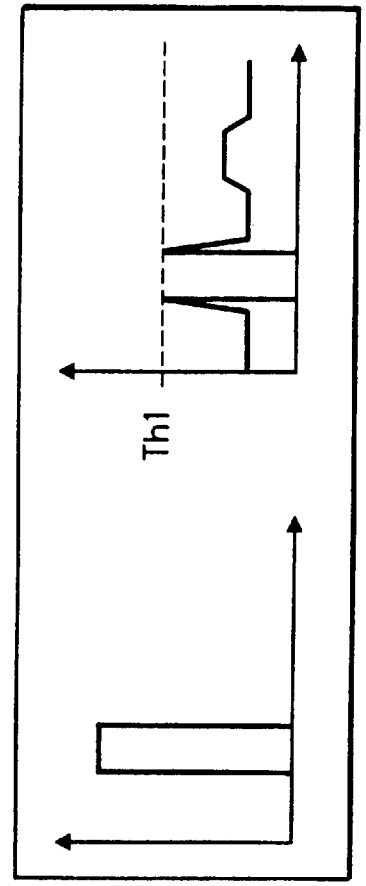
Figure 25C:
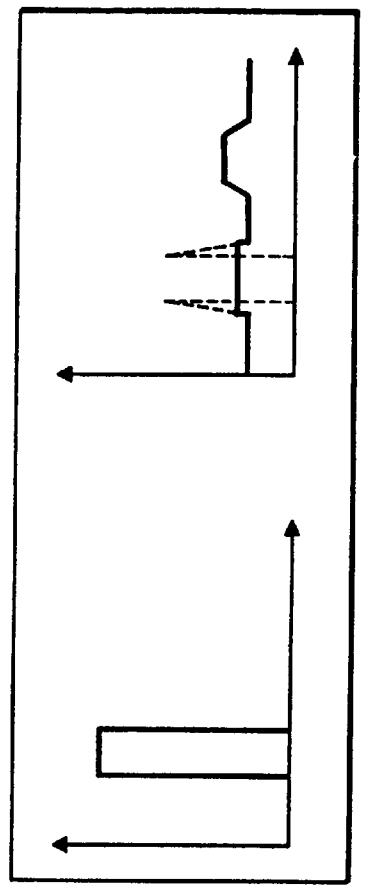

More specifically, color character data is eliminated (FIG. 25B) from an image in which the color character is present as shown in FIG. 25A. At this time, by subtracting the color character, an edge generated as shown in FIG. 25B is also eliminated. As shown in FIG. 25C, data of a pixel which has a hue as in the color character pixel and which is included as surrounding pixels of the color character is also subtracted, and the eliminated portion is substituted with an average value of other pixel data within this block.

At this time, the block of color character elimination processing is the same as that of orthogonal conversion (to be described later).

Figure 26:
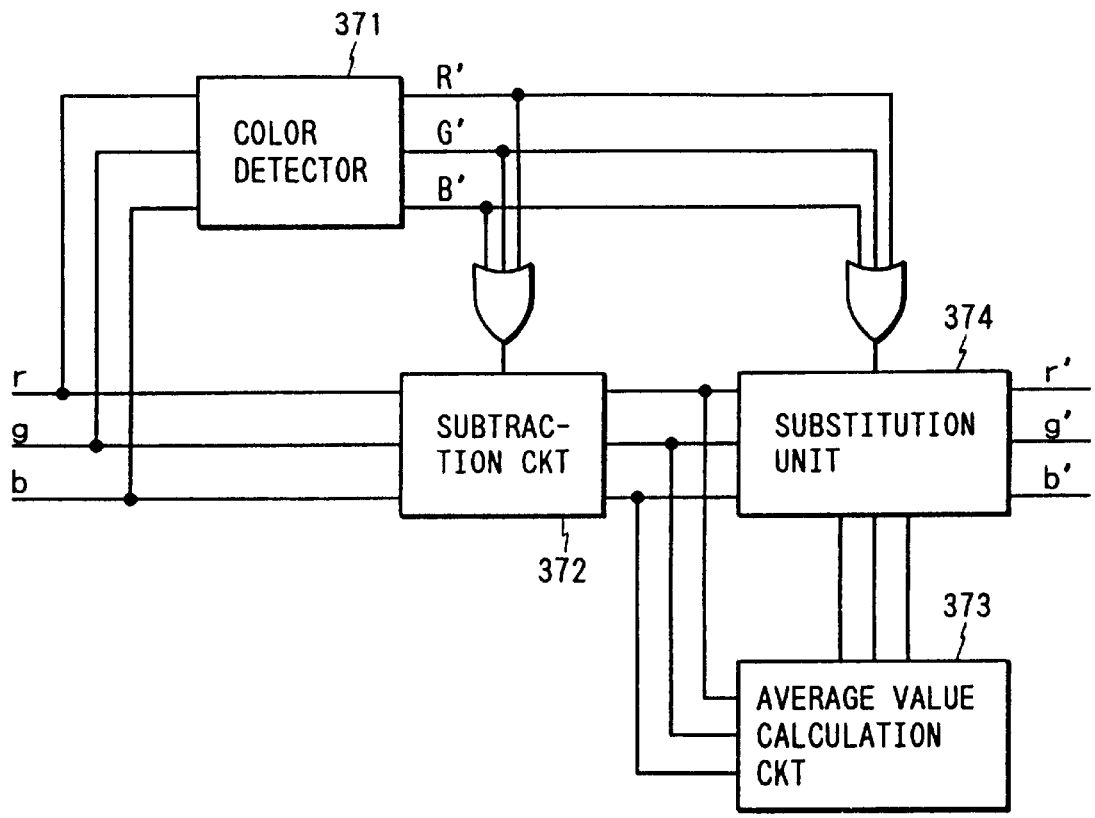
FIG. 26 is a block diagram showing an arrangement of a color character elimination unit.

An arrangement of the color character elimination unit 307 is shown in FIG. 26.

The respective 8-bit pixel image data r, g, and b are input to a color detector 371, and pixels of a color to be eliminated are detected on the basis of conditions (3) to (9). In this case, the threshold values are determined to detect the peripheral portion of the color character:

th1=120, th2=130, th3=30

In this manner, the threshold values of color detection are changed to perform color detection in a range wider than that of the color detector 371. A portion having a color similar to the color character is extracted, and input image data of this portion can also be eliminated.

When at least one of detection signals R', G', and B' from the color detector 371 is set to "1", a pixel whose color should be eliminated is judged to be present. Values of the pixels of r, g, and b are set to zeros in a subtraction circuit 372. In an average value calculation circuit 373, an average value of the r, g, and b data within the 8×8 pixel block is calculated. In a substitution unit 374, the average value is used as substitution data for the color elimination portion, thereby outputting r', g', and b' data.

The substitution data need not be limited to the average value, but can be replaced with a value which most frequently appears, or an intermediate value of the pixels within the block by using a median filter.

In order to accurately extract only a portion having a color similar to a color of the color character from pixels around the color character, an OR signal of the color character judgement signals R, G, and B is logically ANDed with output signals from two OR circuits in FIG. 26. Processing is performed in the subtraction circuit 372 and the substitution unit 374.

<Orthogonal Conversion Unit 308>

The orthogonal conversion unit 308 performs two-dimensional discrete cosine transform in each 8×8 pixel block, the resultant conversion coefficients are quantized, and the quantized data are Huffman-encoded, thereby performing ADCT encoding.

Figure 27:
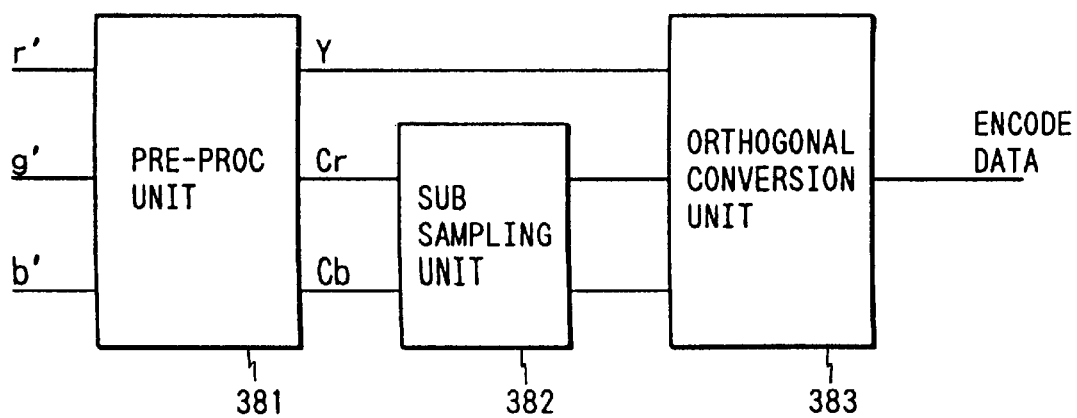
FIG. 27 is a block diagram showing an arrangement of an orthogonal conversion unit.

FIG. 27 shows an arrangement of the orthogonal conversion unit 308. A pre-processing unit 381 converts r', g', and b' 8-bit signals into a luminance signal Y and chrominance signals Cr and Cb in units of pixels. An average value of the Cr and Cb signals is calculated by a sub sampling unit 382 in each 2×3 pixel block. Degradation of the chrominance signal which is less sensitive to human eyes than degradation of the luminance signal is thus utilized. Finally, an orthogonal conversion unit 383 performs ADCT encoding in units of color components, i.e., Y, Cr, and Cb components. This encoding can be performed by using a specific arithmetic circuit or by using computer software.

<Encode Data Transmission Unit 309>

The encode data transmission unit 309 transmits a pattern code of a color character and then frame-sequentially transmits Y, Cr, and Cb encoded data. Prior to transmission in units of color components, a flag representing correspondence between data and a component is transmitted. In this case, a memory is arranged to compensate for a time lag corresponding to a transmission order of data.

As described above, inverse encoding of a color character pattern is performed to perform data processing with high efficiency while high quality of a color character upon encoding is maintained.

Predetermined substitution of a color character and its surrounding portion is performed at the time of separation of the color character from the original data, and orthogonal conversion coding efficiency can be improved.

<Encode Data Reception Unit 310>

The encode data reception unit 310 receives code data from the transmission unit 309, judges whether a code is an arithmetic code or a Huffman code of each of Y, Cr, and Cb on the basis of a flag, and outputs converted data to the inverse arithmetical encode unit 311 and the inverse orthogonal conversion unit 312.

<Inverse Arithmetical Encode Unit 311 and Inverse Orthogonal Conversion Unit 312>

The inverse arithmetical encode unit 311 and the inverse orthogonal conversion unit 312 decode color character data and r', g', and b' multivalue data in an order opposite to arithmetic encoding and orthogonal conversion encoding.

The multivalue decoded r', g', and b' data are smoothed by the smooth unit 313 in units of color components. The color character data is not smoothed, but only the multivalue data is smoothed because degradation of the resolution of the color character can be prevented and a clear color character can be reproduced.

<Synthesis Unit 314>

The synthesis unit 314 synthesizes the decoded color character data and the r', g', and b' multivalue data.

That is, results (R×a, G×a, and B×a) obtained by multiplying the color character data (R, G, and B) with a predetermined coefficient a are synthesized with the multivalue data (r', g', and b'). At the time of synthesis, color character data has a priority over other data as image data of a pixel in which a color character is present. Therefore, a color character is clearly reproduced.

<Image Output Unit 315>

The image output unit 315 is constituted by an image output device (e.g., a laser beam printer, an LED printer, a liquid crystal printer, a thermal transfer printer, a dot printer, or an ink-jet printer) or an image display device (e.g., a CRT display) and forms a visible image on a recording medium in accordance with a reproduction signal.

In particular, ink-jet printers include a bubble-jet printer using a head for injecting a liquid droplet by film boiling utilizing heat energy.

[Fourth Embodiment]

The present invention is also applicable to a recording apparatus such as an image file in addition to an image communication apparatus such as a color facsimile apparatus.

Figure 28:
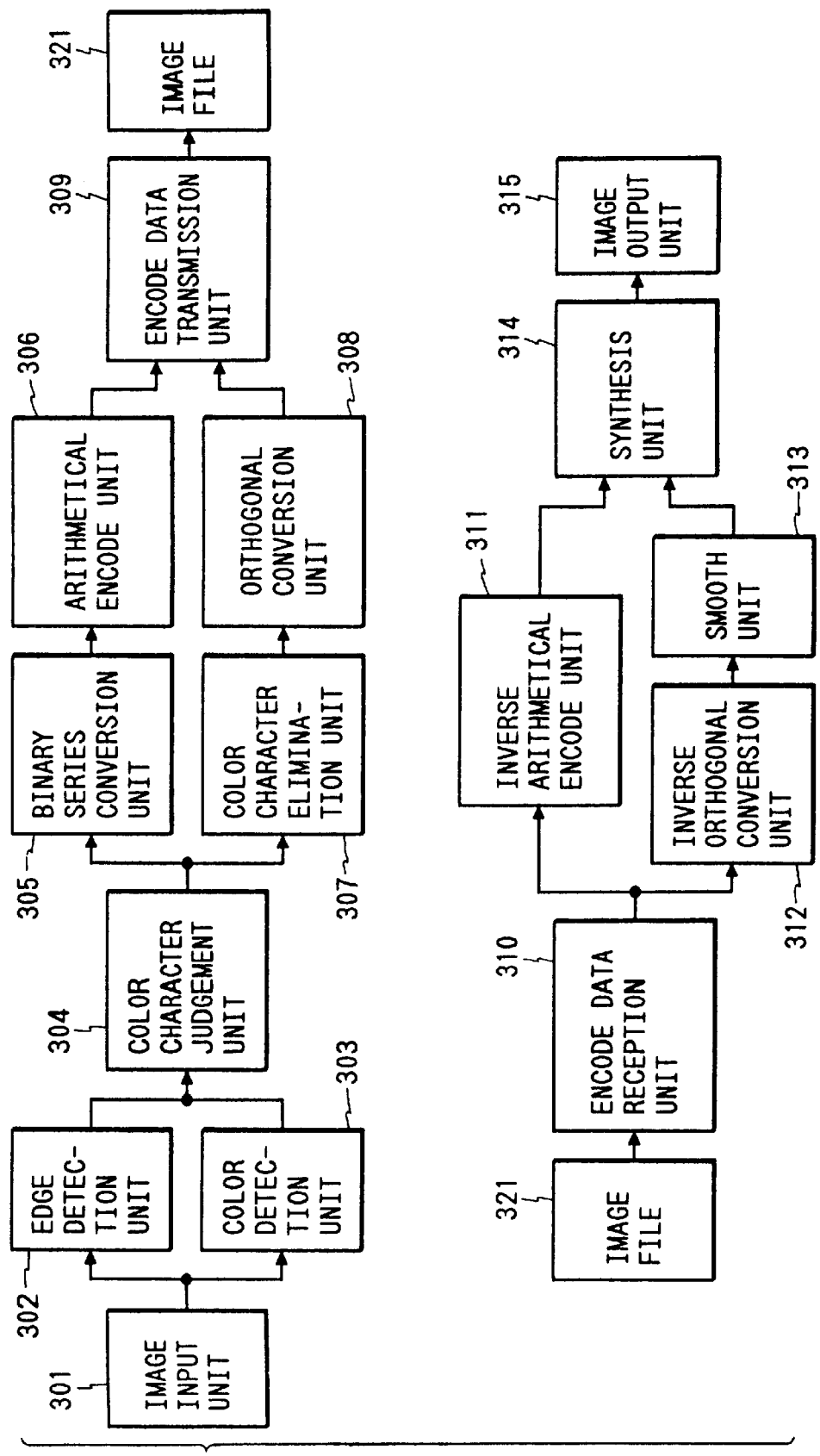
FIG. 28 is a block diagram showing an arrangement according to the fourth embodiment of the present invention.
Figure 29:
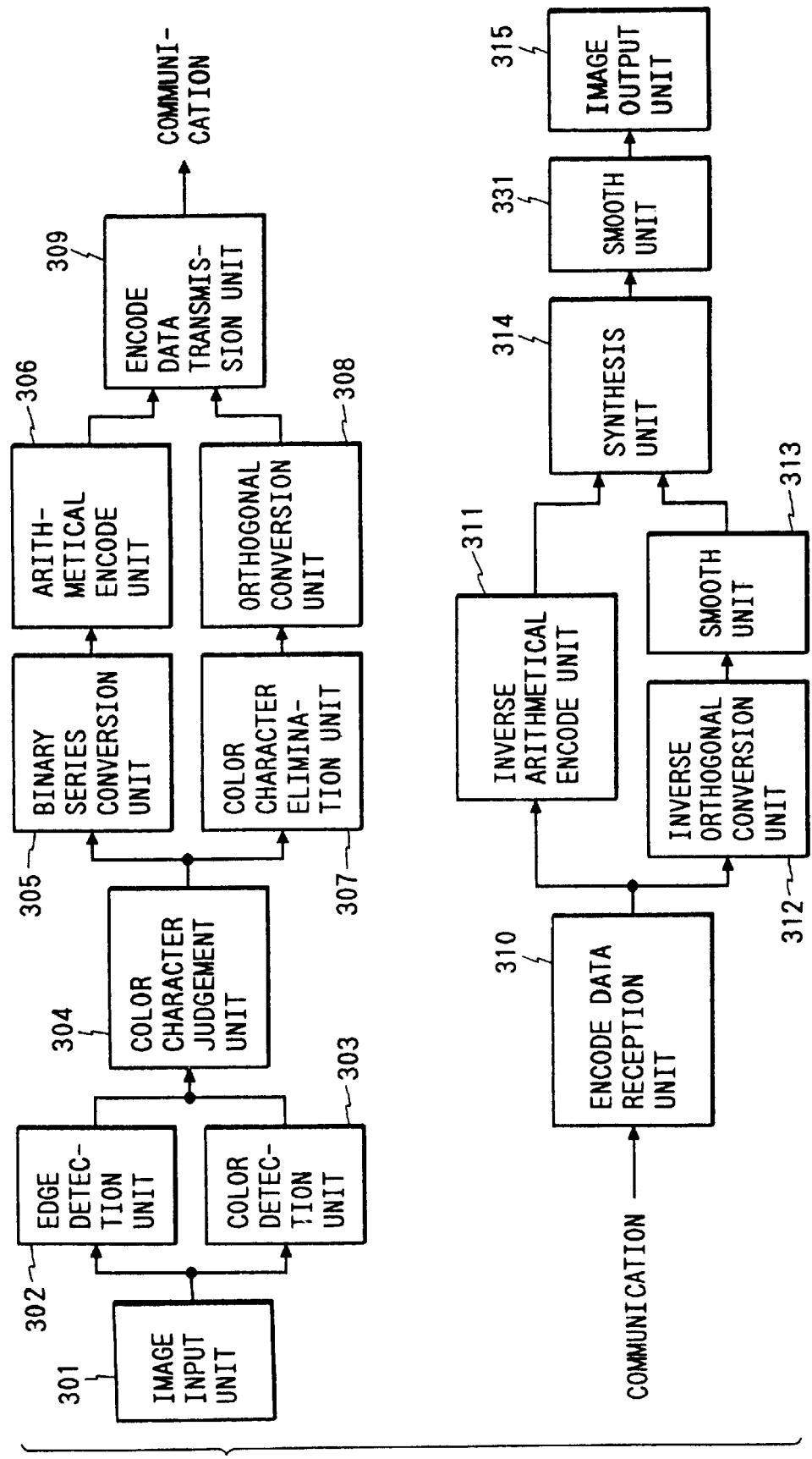
FIG. 29 is a block diagram showing an arrangement according to the fifth embodiment of the present invention.

FIG. 28 shows an arrangement obtained when the present invention is applied to a memory apparatus. Referring to FIG. 28, components 301 to 315 are identical with those in FIG. 21, and a detailed description thereof will be omitted. An image file 321 is constituted by a hard disk, a ROM, or a RAM and can store a plurality of images. At the time of storage, arithmetic and Huffman codes may be separately stored, or an image constituted by these codes may be stored as a whole. For example, when only a character portion is to be used for a display or hard copy, only the arithmetic codes are decoded. In this case, the processing time can be shortened.

[Fifth Embodiment]

This embodiment is obtained by adding a smooth unit 331 on the output side of an image synthesis unit 314 for decoding, in addition to the arrangement of the third embodiment.

A smoothing filter of, e.g., a 3×3 pixel block, can be used for smoothing. In addition, a coefficient representing a weighted average value of the objective pixel and its surrounding pixels may be used as a filter coefficient.

In this embodiment, smoothing is performed after a color character and a multivalue image are synthesized. An unnatural boundary between the color character portion and the multivalue image can be prevented. This is very effective to read an image containing a character and a natural image by means of a CCD sensor. For example, as in computer graphics, when an image is given such that a character can be distinctly separated, smoothing need not be performed.

As described above, according to this embodiment of the present invention, color character portions present in an input image are simultaneously detected and are then simultaneously encoded, so that a plurality of color characters can be encoded at high speed. In addition, the color characters are encoded separately from a gradation image portion, thereby performing encoding with high efficiency while high image quality is maintained. That is, highly efficient noninvertible encoding is performed for a gradation image to compensate for loss of a high-frequency component caused by encoding of the gradation image. Ringing can be prevented by encoding an edge portion and, particularly, a color character portion in accordance with entropy encoding, and a high-quality color image portion can be reproduced.

In addition to the color character portion, a color portion which surrounds the color character portion and has a color similar to that of the color character portion is also eliminated from a gradation image, and predetermined substitution is performed to greatly improve gradation image efficiency.

The image input unit 301 need not be limited to a CCD line sensor, but can be replaced with an interface for outputting a computer processing result, a still video camera for recording a still image, or a video camera for recording a motion image.

In particular, computer interfaces include, e.g., an interpreter of a page descriptive language such as a postscript or PCL.

The input signals are not limited to R, G, and B color components, but may be constituted by a (Y,I,Q), (L*,a*,b*), (L*,u*,v*), or (Y,M,C) system.

Color component signals for color detection need not be limited to the R, G, and B signals.

The color character encoding method is not limited to binary series conversion or arithmetic encoding, but may be replaced with invertible encoding such as run-length encoding, MH, MR, or MMR.

The multivalue image encoding method is not limited to ADCT either. This encoding method may be constituted by vector quantization or any other orthogonal encoding.

The types and number of color characters to be detected are not limited to the specific ones described above.

A plurality of conventional circuits for extracting a black character may be arranged for a plurality of colors, and a plurality of color characters can be extracted.

The present invention is not limited to an encoding apparatus, but can be applied to an image processing apparatus and, particularly, a copying apparatus and a color image editing apparatus for performing color conversion processing and line image extraction processing.

According to the present invention, as has been described, there is provided an image processing apparatus capable of separating an image and a line image portion with high precision.

The present invention is not limited to the particular embodiments described above. Various changes and modifications may be made within the scope of the appended claims.

What is claimed is:

1. A color image encoding apparatus, comprising:

input means for inputting a color image;

separation means for separating out from the input image, a color character image and an image other than the color character image;

first encoding means for encoding the color character image using a first encoding method suitable for a color character;

second encoding means for encoding the image other than the color character image using a second encoding method different from the first encoding method; and transmission means for transmitting encoded data encoded by said first and second encoding means.

2. An apparatus according to claim 1, wherein said first encoding means performs binary encoding.

3. An apparatus according to claim 2, wherein said first encoding means performs arithmetic encoding.

4. An apparatus according to claim 2, wherein said first encoding means performs MH (modified Huffman), MR (modified READ) or MMR (modified modified READ) encoding.

5. An apparatus according to claim 1, wherein said second encoding means performs multivalue encoding.

6. An apparatus according to claim 4, wherein said second encoding means performs orthogonal transformation encoding.

7. A color image encoding method, comprising:

an input step of inputting a color image;

a separation step of separating out from the input image, a color character image and an image other than the color character image;

a first encoding step of encoding the color character image using a first encoding method suitable for a color character;

a second encoding step of encoding the image other than the color character image using a second encoding method different from the first encoding method; and a transmission step of transmitting encoded data encoded in said first and second encoding steps.

8. A color image encoding apparatus, comprising:

input means for inputting a color character image and an image other than the color character image, both images contained in a same color image;

first encoding means for encoding the color character image using a first encoding method suitable for a color character;

second encoding means for encoding the image other than the color character image using a second encoding method different from the first encoding method; and transmission means for transmitting encoded data encoded by said first and second encoding means.

9. An apparatus according to claim 8, wherein said first encoding means performs binary encoding.

10. An apparatus according to claim 9, wherein said first encoding means performs arithmetic encoding.

11. An apparatus according to claim 9, wherein said first encoding means performs MH (modified Huffman), MR (modified READ) or MMR (modified modified READ) encoding.

12. An apparatus according to claim 8, wherein said second encoding means performs multivalue encoding.

13. An apparatus according to claim 12, wherein said second encoding means performs orthogonal transformation encoding.

14. A color image encoding method, comprising:

an input step of inputting a color character image and an image other than the color character image, both images contained in a same color image;

a first encoding step of encoding the color character image using a first encoding method suitable for a color character;

a second encoding step of encoding the image other than the color character image using a second encoding method different from the first encoding method; and a transmission step of transmitting encoded data encoded in said first and second encoding steps.

15. A color image decoding apparatus, comprising:

input means for inputting a color character image and an image other than the color character image, the color character image being encoded using a first encoding method and the image other than the color character image being encoded using a second encoding method different from the first encoding method;

decoding means for decoding the color character image and the image other than the color character image; and synthesizing means for synthesizing the decoded color character image and the decoded image other than the color character image.

16. An apparatus according to claim 15, wherein said first encoding means performs binary encoding.

17. An apparatus according to claim 16, wherein said first encoding means performs arithmetic encoding.

18. An apparatus according to claim 16, wherein said first encoding means performs MH (modified Huffman), MR (modified READ) or MMR (modified modified READ) encoding.

19. An apparatus according to claim 15, wherein said second encoding means performs multivalue encoding.

20. An apparatus according to claim 19, wherein said second encoding means performs orthogonal transformation encoding.

21. A color image decoding method, comprising:

an input step of inputting a color character image and an image other than the color character image, the color character image being encoded using a first encoding method and the image other than the color character image being encoded using a second encoding method different from the first encoding method;

a decoding step of decoding the color character image and the image other than the color character image; and a synthesizing step of synthesizing the decoded color character image and the decoded image other than the color character image.

\* \* \* \* \*

UNITED STATES PATENT AND TRADEMARK OFFICE
CERTIFICATE OF CORRECTION

PATENT NO. : 5,909,505

DATED : June 1, 1999

INVENTORS : Akihiro Katayama, et al.

It is certified that error appears in the above-identified patent and that said Letters Patent is hereby corrected as shown below:

COVER PAGE

Under [56] References Cited, Foreign Patent Documents, "03192876" should read --3-192876--.

COLUMN 14

Line 7, "feature" should read --features--.

Signed and Sealed this

Sixteenth Day of November, 1999

Attest:

Q. TODD DICKINSON

*Attesting Officer*    *Acting Commissioner of Patents and Trademarks*